US008963926B2

(12) United States Patent
Brown et al.

(10) Patent No.: US 8,963,926 B2
(45) Date of Patent: *Feb. 24, 2015

(54) USER CUSTOMIZED ANIMATED VIDEO AND METHOD FOR MAKING THE SAME

(75) Inventors: Dirk D. Brown, Mountain View, CA (US); David Ludwigsen, Avondale, PA (US); Loch T. Brown, Vancouver (CA); Christopher James MacDonald, Brisbane, CA (US); Harrison Rose, Sunnyvale, CA (US); Jeffrey Alan Amdur, Edison, NJ (US); Robert John Glassett, Fair Lawn, NJ (US)

(73) Assignee: Pandoodle Corporation, Lexington, SC (US)

( * ) Notice: Subject to any disclaimer, the term of this patent is extended or adjusted under 35 U.S.C. 154(b) by 1062 days.

This patent is subject to a terminal disclaimer.

(21) Appl. No.: 12/948,750

(22) Filed: Nov. 17, 2010

(65) Prior Publication Data

US 2011/0064388 A1    Mar. 17, 2011

Related U.S. Application Data

(63) Continuation-in-part of application No. 11/456,771, filed on Jul. 11, 2006, now Pat. No. 8,077,179.

(60) Provisional application No. 61/262,144, filed on Nov. 17, 2009.

(51) Int. Cl.
| | | |
|---|---|---|
| *G06T 13/00* | (2011.01) | |
| *G06T 13/80* | (2011.01) | |
| *G06T 13/20* | (2011.01) | |
| *G06T 15/02* | (2011.01) | |

(52) U.S. Cl.
CPC .............. *G06T 13/80* (2013.01); *G06T 13/20* (2013.01); *G06T 15/02* (2013.01)

USPC .......................................................... 345/473

(58) Field of Classification Search
None
See application file for complete search history.

(56) References Cited

U.S. PATENT DOCUMENTS

| | | | |
|---|---|---|---|
| 6,226,015 B1 | 5/2001 | Danneels et al. | |
| 6,463,205 B1 | 10/2002 | Aschbrenner et al. | |
| 6,677,967 B2 | 1/2004 | Sawano et al. | |
| 7,098,920 B2 | 8/2006 | Marschner et al. | |

(Continued)

OTHER PUBLICATIONS

Hong Chen et al., "PicToon: A Personalized Image-based Cartoon System," In Proceedings of the Tenth ACM International Conference on Multimedia (Juan-les-Pins, France, Dec. 1-6, 2002). Multimedia '02, ACM, New Yourk, NY, 171-178.

*Primary Examiner* — Daniel Hajnik
(74) *Attorney, Agent, or Firm* — Van Pelt, Yi & James LLP

(57) ABSTRACT

A customized animation video system and method generate a customized or personalized animated video using user input where the customized animated video is rendered in a near immediate timeframe (for example, in less than 10 minutes). The customized animation video system and method of the present invention enable seamless integration of an animated representation of a subject or other custom object into the animated video. That is, the system and method of the present invention enable the generation of an animated representation of a subject that can be viewed from any desired perspective in the animated video without the use of multiple photographs or other 2D depictions of the subject. Furthermore, the system and method of the present invention enables the generation of an animated representation of a subject that is in the same graphic style as the rest of the animated video.

6 Claims, 29 Drawing Sheets

(56) References Cited

U.S. PATENT DOCUMENTS

| | | | |
|---|---|---|---|
| 2003/0020718 A1* | 1/2003 | Marshall et al. | 345/474 |
| 2003/0025726 A1* | 2/2003 | Yamamoto | 345/723 |
| 2003/0156134 A1* | 8/2003 | Kim | 345/753 |
| 2004/0152512 A1* | 8/2004 | Collodi et al. | 463/30 |
| 2005/0007384 A1* | 1/2005 | Yamada et al. | 345/619 |

* cited by examiner

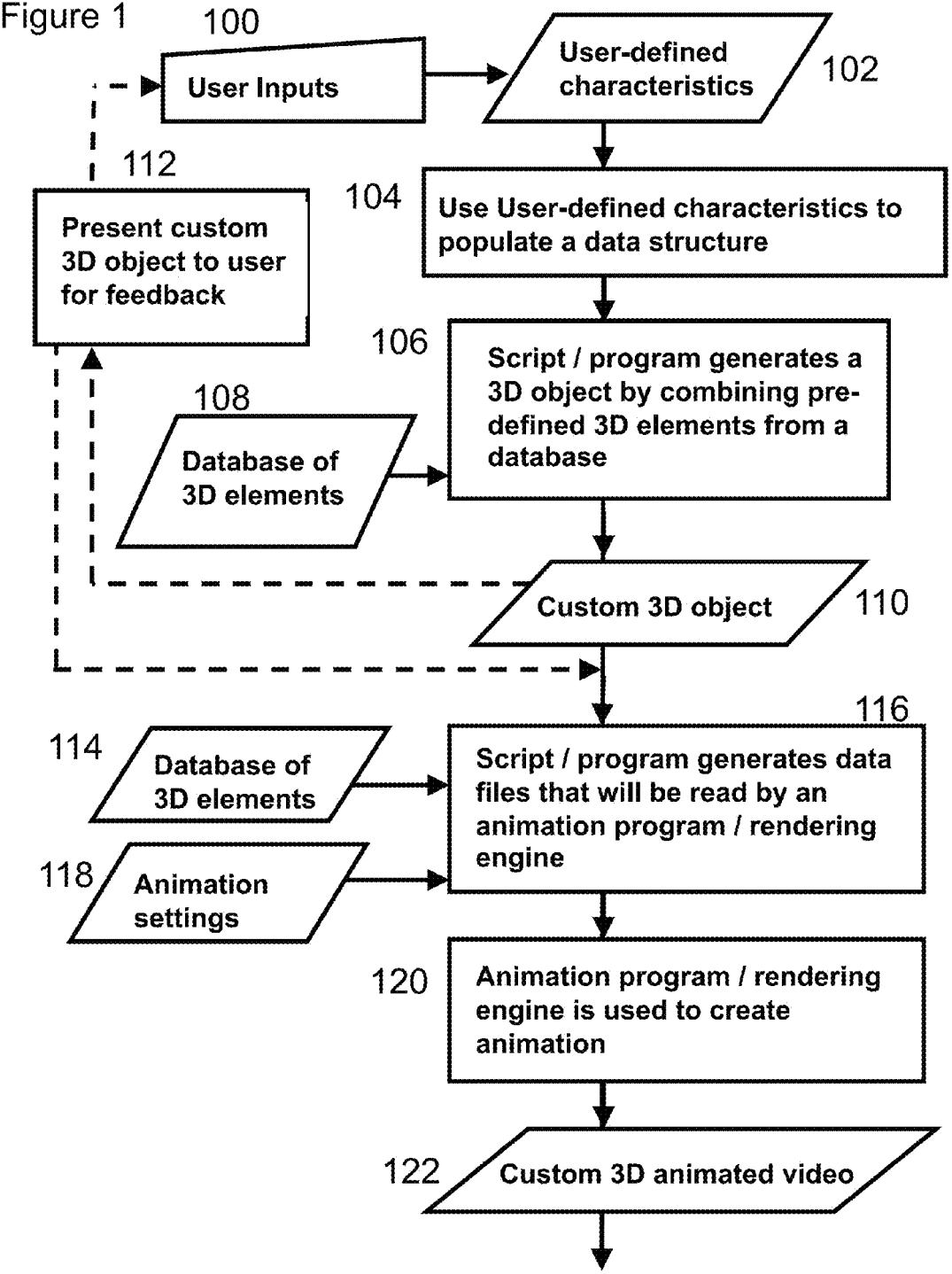

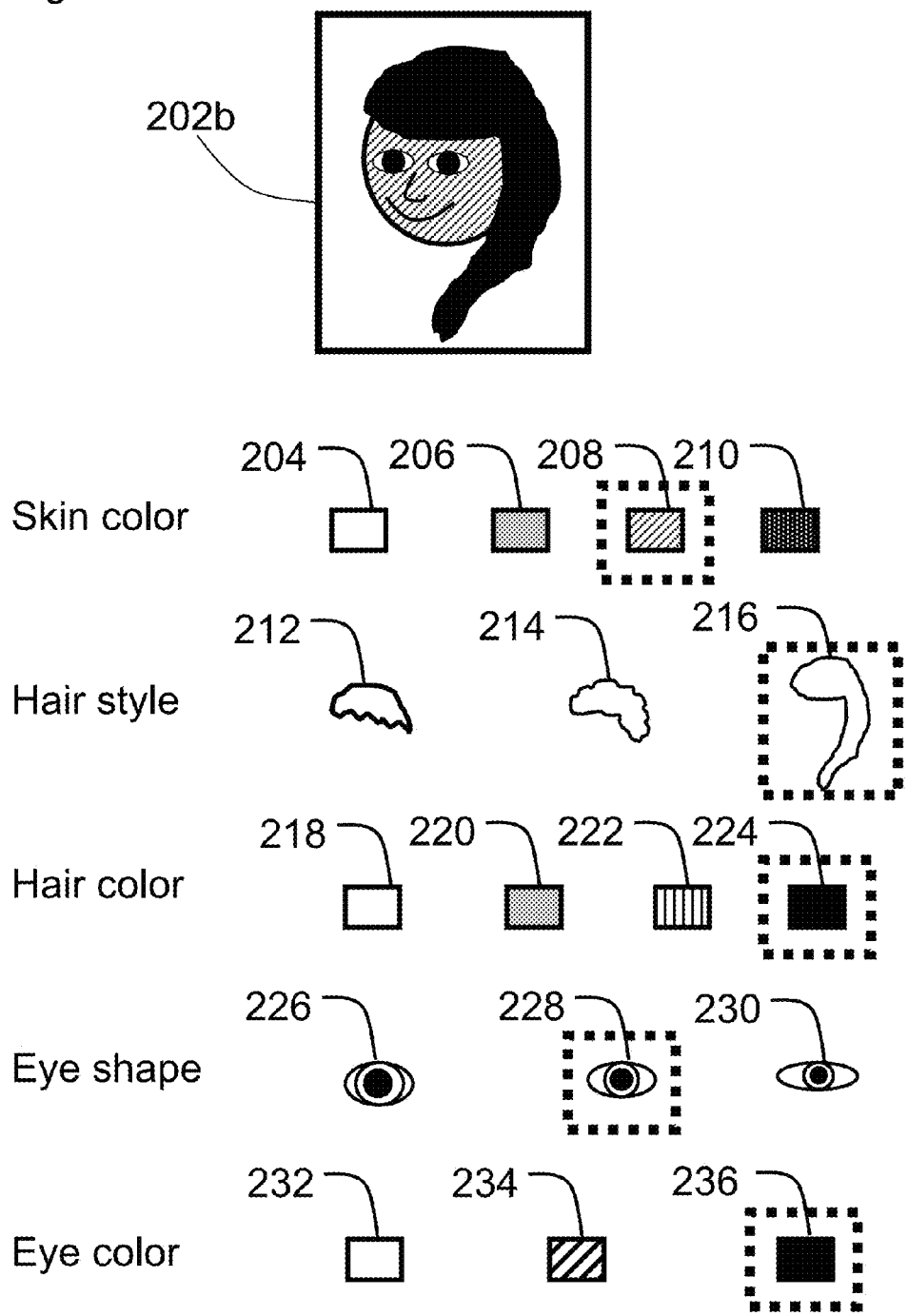

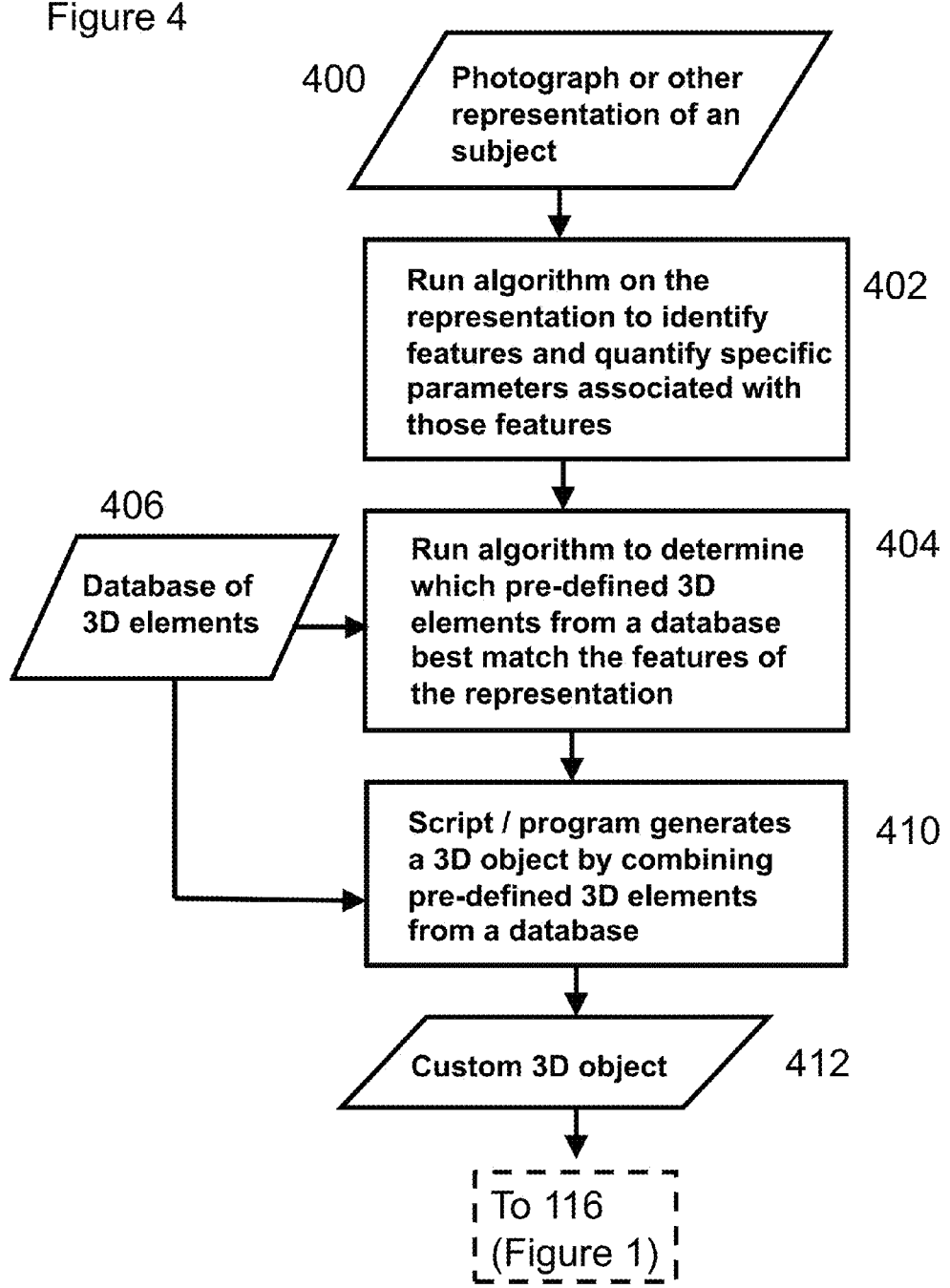

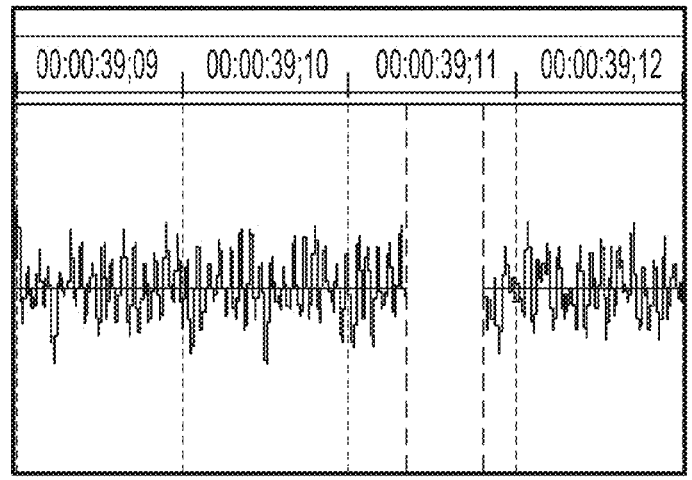
FIG. 6B(i)
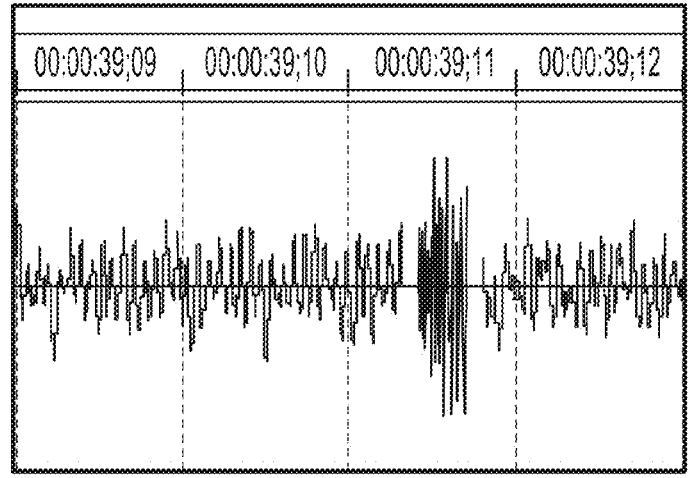
FIG. 6B(ii)
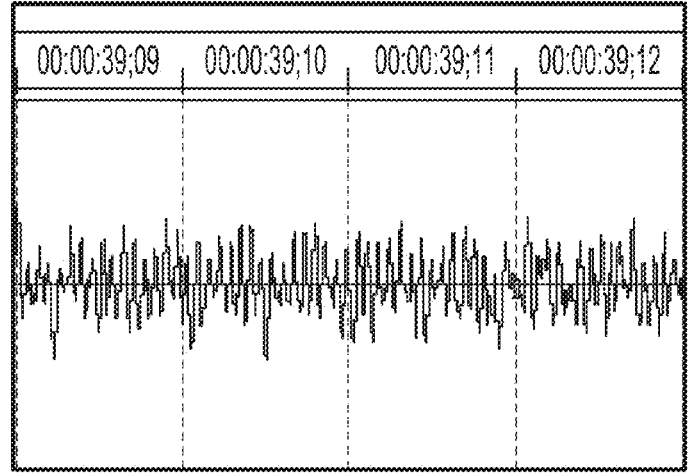
FIG. 6B(iii)

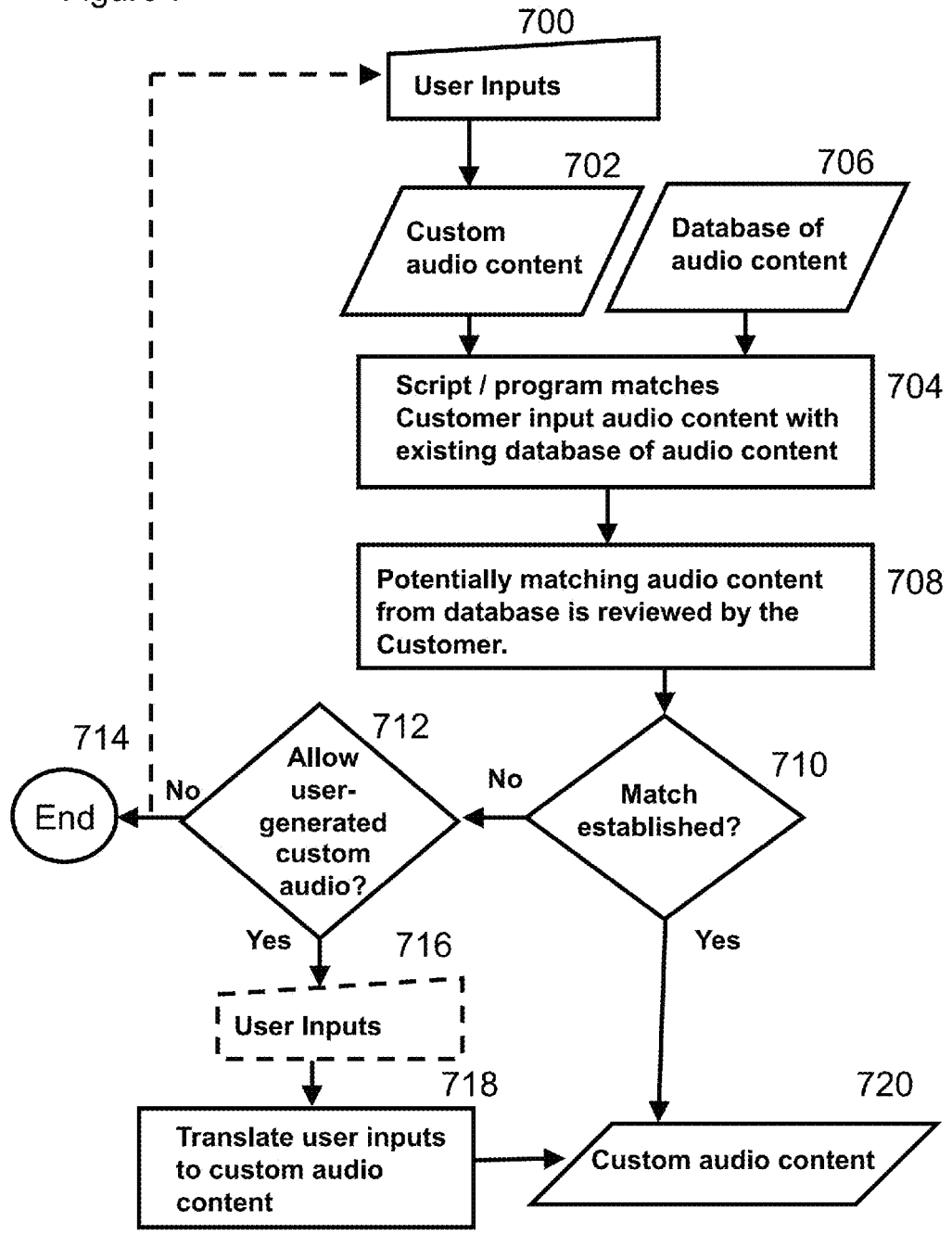

Figure 9B: 2D representation of an object
Figure 9C: 3D representation of an object
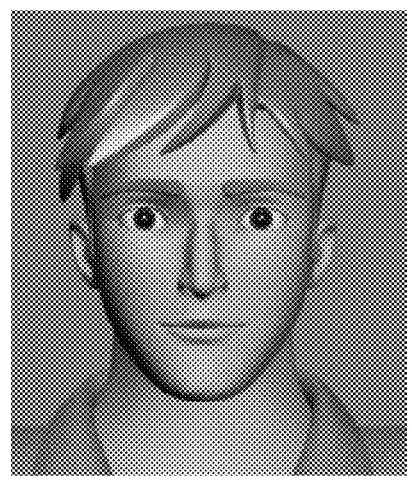

Start → End
Time

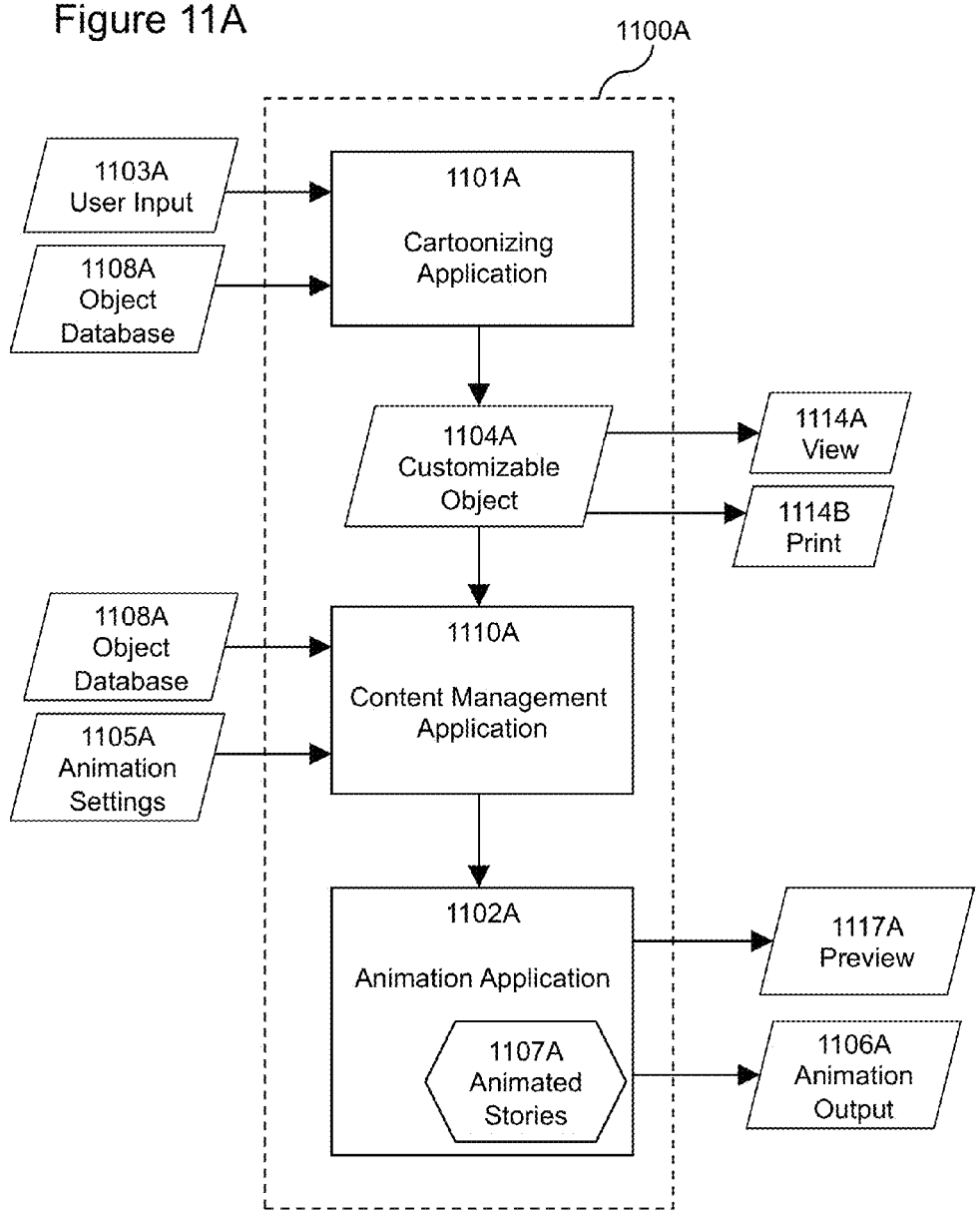

USER CUSTOMIZED ANIMATED VIDEO AND METHOD FOR MAKING THE SAME

CROSS-REFERENCE TO RELATED APPLICATIONS

This application claims the benefit of U.S. Provisional Patent Application Ser. No. 61/262,144, filed on Nov. 17, 2009, which application is incorporated herein by reference in its entirety.

This application is a continuation-in-part of application Ser. No. 11/456,771, filed Jul. 11, 2006, entitled "System And Method For Creating Animated Video With Personalized Elements," having at least one common inventor, which patent application is incorporated herein by reference in its entirety.

FIELD OF THE INVENTION

This invention relates to the creation of customized animated videos driven by input from a user. The invention also relates to the resulting data file's images and audio track synchronization.

DESCRIPTION OF THE RELATED ART

3D Computer Graphics, in contrast to 2D computer graphics, are graphics that utilize a three-dimensional representation of geometric data that is stored in the computer for the purposes of performing calculations and rendering 2D images (see for example definition and description from Wikipedia). Such images may be for later display or for real time viewing. Despite these differences, 3D computer graphics rely on many of the same algorithms as 2D computer vector graphics in the wire-frame model and 2D computer raster graphics in the final rendered display. In computer graphics software, the distinction between 2D and 3D is occasionally blurred; 2D applications may use 3D techniques to achieve effects such as lighting, and 3D may use 2D rendering techniques. 3D computer graphics are often referred to as 3D models. Apart from the rendered graphic, the model is contained within the graphical data file. However, there are differences. A 3D model is the mathematical representation of any three-dimensional object (either inanimate or living). A model is not technically a graphic until it is visually displayed. Due to 3D printing, 3D models are not confined to virtual space. A model can be displayed visually as a two-dimensioned image through a process called "3D rendering," or used in non-graphical computer simulations and calculations.

The process of creating 3D computer graphics can be sequentially divided into three basic phases: 3D modeling which describes the process of forming the shape of an object, layout and animation which describes the motion and placement of objects within a scene, and 3D rendering which produces an image of an object.

Modeling describes the process of forming the shape of an object. The two most common sources of 3D models are those originated on the computer by an artist or engineer using some kind of 3D modeling tool and those scanned into a computer from real-world objects. Models can also be produced procedurally or via physical simulation.

Before an object is rendered, it must be placed (layout/laid out) within a scene. This is what defines the spatial relationship between objects in a scene including location and size. Animation refers to the temporal description of an object, i.e., how it moves and deforms over time. Popular methods include key framing, inverse kinematics, and motion capture, though many of these techniques are used in conjunction with each-other. As with modeling, physical simulation is another way of specifying motion.

Rendering is the final process of creating the actual 2D image or animation from the prepared scene. Rendering converts a model into an image by simulating light transport to get photorealistic images, or by applying some kind of style as in non-photorealistic rendering. The two basic operations in realistic rendering are transport (how much light gets from one place to another) and scattering (how surfaces interact with light). The rendering step is usually performed using 3D computer graphics software or a 3D API (application programming interfaces). The process of altering the scene into a suitable form for rendering also involves 3D projection which allows a three-dimensional image to be viewed in two dimensions.

Not all computer graphics that appear 3D are based on a wireframe model. 2D computer graphics with 3D photorealistic effects are often achieved without wireframe modeling and are sometimes indistinguishable in the final form. Some graphic art software includes filters that can be applied to 2D vector graphics or 2D raster graphics on transparent layers. Visual artists may also copy or visualize 3D effects and manually render photorealistic effects without the use of filters.

More recently, technology has allowed companies to economically offer customized video, including video that is at least partially animated. One example is customized video offered by companies such as PixFusion, Jam Video, and MeMovies, in which a digital photograph image of an individual's face is incorporated into an otherwise animated video. These animated video products have the limitation that the image of the individual is not integrated seamlessly into the animated video. That is, the image of the individual may not match the style of the other characters of the animated video or the image of the individual may not have the correct view point when incorporated in the animated video.

In the conventional systems, it is not possible to generate an animated representation of a subject or other custom object that can be viewed from any desired perspective in the animated video without the use of multiple photographs or other 2D depictions of the subject or object. This type of system has the further limitation that it is impractical through direct manipulation of a photograph or other 2D depiction of a subject to generate a 3D animated representation of a subject, and in particular one that matches the animation style typically desired in an animated video. 3D animated representations of subjects derived by a program manipulating a photograph or other 2D depiction of a subject tend to have a very precise, lifelike style, whereas the preferred style of most animated videos is more whimsical with features that are not precise or lifelike.

Another limitation of this type of system is that it requires extensive computation in order to manipulate the photograph or other 2D depiction of a subject to generate a 3D animated representation of the subject. This extensive computation generally takes many minutes, even on very powerful machines, and does not allow for incorporation of the animated representation of the individual into a video and subsequent rendering in a near immediate timeframe.

SUMMARY OF THE INVENTION

According to one embodiment of the present invention, a system for generating cartoonized representations of a subject and incorporating the cartoonized representations into an animated video includes a cartoonizing application configured to receive data input describing features of the subject and to select one or more objects from a database of cartoonized objects that matches the features of the subject as described by the data input where the cartoonizing application is configured to generate one or more customizable objects representative of the subject; a content management application configured to receive the one or more customizable objects from the cartoonizing application and to receive data input defining one or more pre-selected animation settings where the content management application is configured to generate data files being an assembly of one or more objects, the assembly of one or more objects including the one or more customizable objects generated by the cartoonizing application or one or more customizable objects selected from the database of cartoonized objects based on the pre-selected animation settings; and an animation application configured to receive the data files from the content management application and operative to render an animated video using the data files and a selected animated story. In operation, the animated video thus rendered includes the assembly of one or more objects integrated seamlessly into the animated story to create a customized animated story incorporating the cartoonized representations of the subject and the pre-selected animated settings.

The present invention is better understood upon consideration of the detailed description below and the accompanying drawings.

BRIEF DESCRIPTION OF THE DRAWINGS

FIG. 1 is a flowchart illustrating the customized animated video method according to one embodiment of the present invention.

FIGS. 2a and 2b show one embodiment of a menu that could be used to assist the user to input customizing information about an individual's facial features.

FIG. 4 is a flowchart illustrating the customized animated video method according to an alternate embodiment of the present invention in which a photograph or other representation of an individual or a subject is used as the initial input to the customized animation video system.

FIG. 6B shows an example frequency vs. time plot of an audio track segment that is being customized according to one embodiment of the present invention.

FIG. 7 is a flowchart illustrating a method which allows a user to verify and/or correct the pronunciation of a customized word or phrase in a video according to one embodiment of the present invention.

FIG. 9B shows a 2D representation of a person and FIG. 9C shows a 3D representation of the same person.

FIG. 11A illustrates a customized animation video system according to one embodiment of the present invention.

DETAILED DESCRIPTION OF THE PREFERRED EMBODIMENTS

Figure 2A:
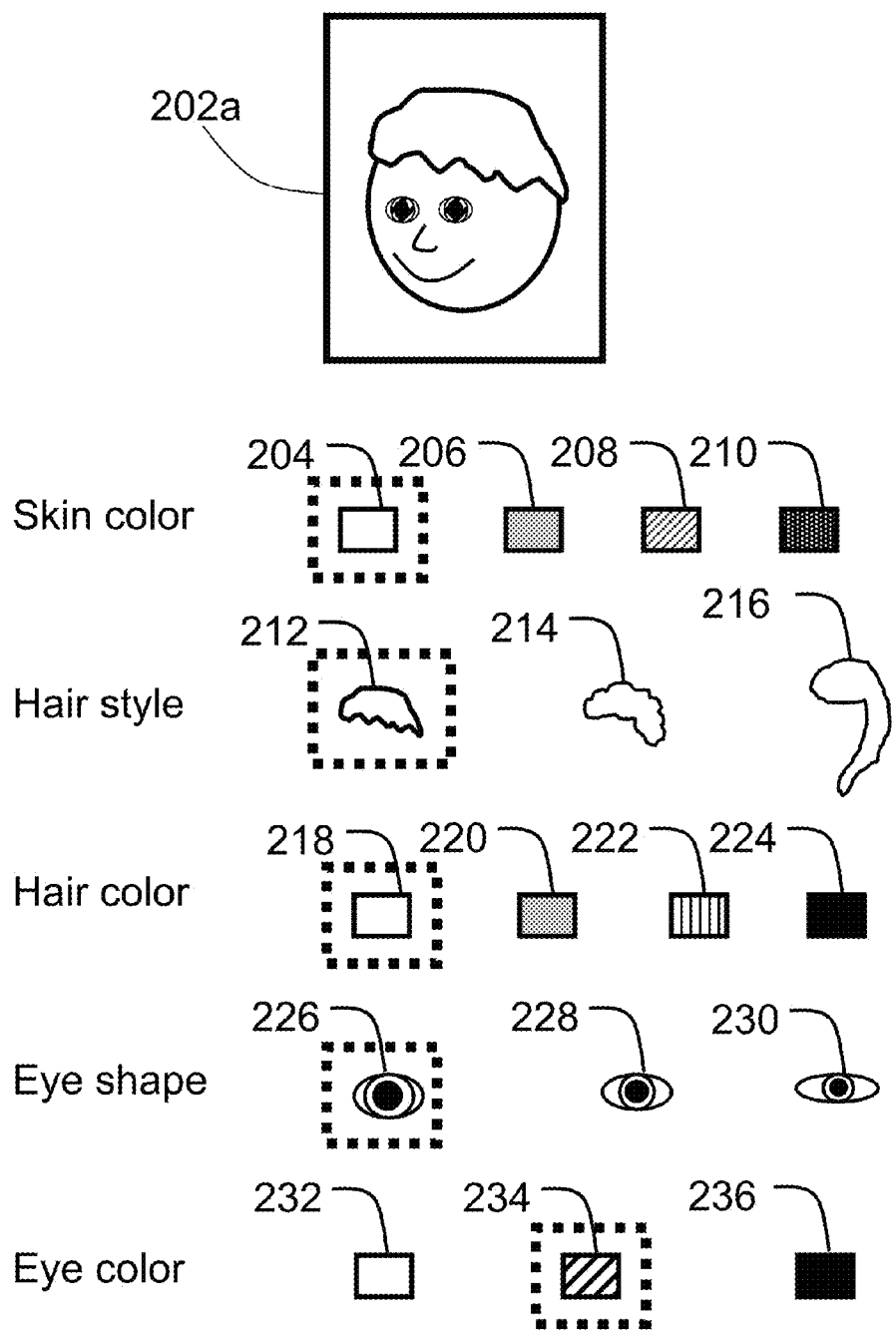
Figure 3A:
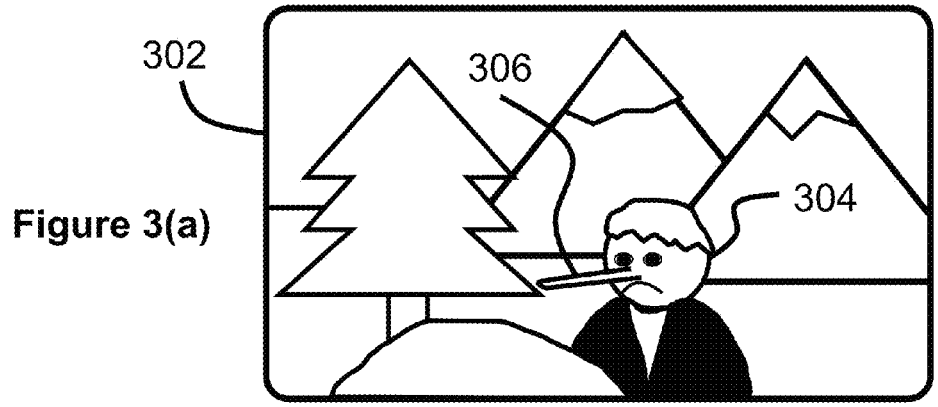
FIGS. 3(a) to 3(c) illustrates different animated images that can be generated using the menu interface shown in FIGS. 2(a) and 2(b).
Figure 3B:
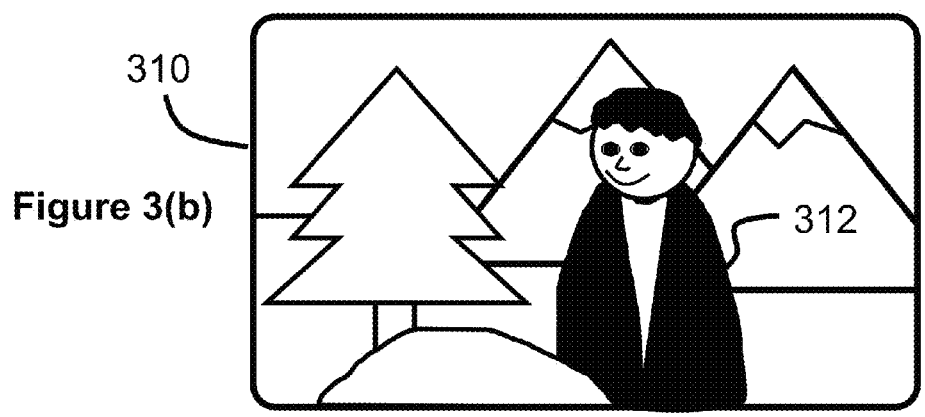
Figure 3C:
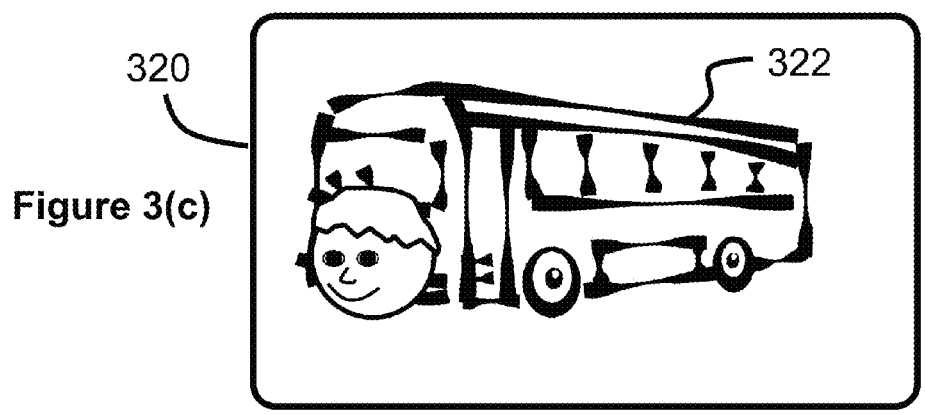
Figure 3D:
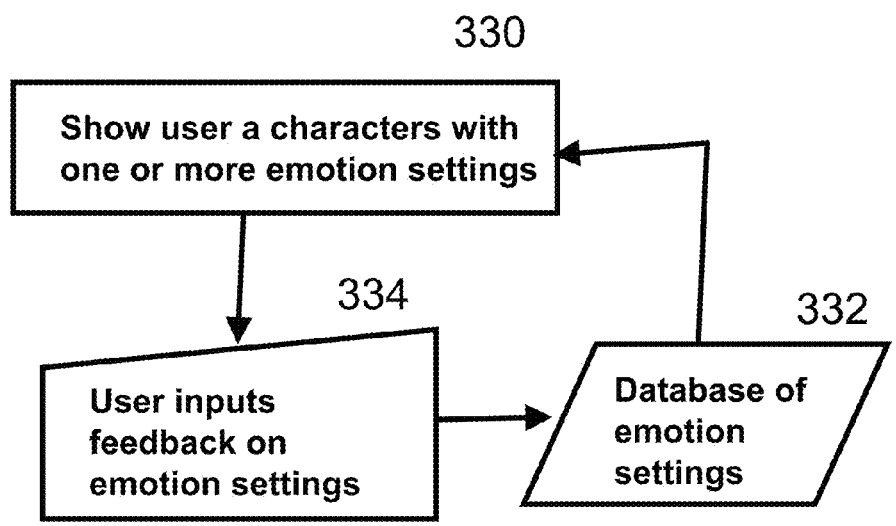
FIG. 3(d) is a flowchart illustrating the facial expression synthesis method according to one embodiment of the present invention.

In accordance with the principles of the present invention, a customized animation video system and method generate a customized or personalized animated video using user input where the customized animated video is rendered in a near immediate timeframe (for example, in less than 10 minutes). More importantly, the customized animation video system and method of the present invention enable seamless integration of an animated representation of a subject or other custom object into the animated video. That is, the system and method of the present invention enable the generation of an animated representation of a subject that can be viewed from any desired perspective in the animated video without the use of multiple photographs or other 2D depictions of the subject. Furthermore, the system and method of the present invention enables the generation of an animated representation of a subject that is in the same graphic style as the rest of the animated video.

In some embodiments, the customized animation video system of the present invention provides a user interface for accepting and/or prompting user input to create characters for the animated video with realistic yet esthetically pleasing faces, torsos and movements. The resulting characters may be personalized whimsical characters with recognizable features that create a sympathetic response by a viewer. In other embodiments, the customized animation video system of the present invention enables a user to tailor the storyline of an animated video by selecting characters, scenes, dialogue, and sequence of events.

In this manner, the customized animation video system and method of the present invention address the need to create a customized animation in a time frame acceptable to a user who may access a web based ordering site to generate the customized animation. The system and method of the present invention provide a rendered video in a near immediate timeframe of less than ten minutes and as little as a minute or less following the input of the customizing information. In this manner, a user may review the rendered video, without undue delay, to assess the quality of the customized animation video prior to making decisions such as whether to purchase the video or reenter the customizing information. The system and method of the present invention provides many advantages as will be come clear from the description below.

In one embodiment, the present invention includes a system for cartoonizing an image and incorporating said image into an animated video, including a cartoonizing application to cartoonize said image and create a cartoonized output, and an animation application to incorporate said cartoonized output into an animated video based on an animated story selected from a database of predefined animated stories. The image may be obtained from a photograph or other two-dimensional depiction of a subject. The cartoonizing application may include at least one graphics editing option, which may be further selected from an option to select a portion of the photograph or other two-dimensional depiction of a subject to be cartoonized, an option to adjust the size of the image, and combinations thereof. The system may be configured to display the cartoonized output as a preview prior to the animation application incorporating the cartoonized output into the animated video. The animation application may further include the database of predefined animated stories. Each predefined animated story in the database of predefined animated stories may further comprise a series of templates with positions assigned on each template for insertion of the cartoonized output on those of said templates in which the cartoonized output is predetermined to appear. Each template may be assigned at least one feature to further modify or select a version of said cartoonized output. The version of the cartoonized output may be selected from facial position type, palette of skin tone, and combinations thereof. The animation application may be configured to receive at least one user input selected from a selection of a predefined animated story from the database of predefined animated stories, a selection of a character parameter, a selection of a format of a system output, and combinations thereof. The system may be configured to produce a system output comprising an animated video. The system may be configured to store the system output on an electronic medium, to transmit the system output through an electronic communications network, or both. The cartoonizing application may be configured to cartoonize an image for each of a number of subjects and create a cartoonized output for each such cartoonized image, and the animation application may be configured to incorporate each of the cartoonized outputs into the animated video based on the animated story selected from the database of predefined animated stories. Each predefined animated story in the database of predefined animated stories may further comprise a series of templates with positions assigned on each template for insertion of one or more of the cartoonized outputs on those of the templates in which one or more of the cartoonized outputs is predetermined to appear.

In another embodiment, the present invention includes a method for cartoonizing an image and incorporating the image into an animated video, comprising: providing a system comprising a cartoonizing application to cartoonize the image and create a cartoonized output, an animation application to incorporate the cartoonized output into an animated video based on an animated story selected from a database of predefined animated stories, and the database of predefined animated stories; providing a photograph or other two-dimensional depiction of a subject; selecting a portion of the subject from the photograph or other two-dimensional depiction of the subject; cartoonizing the portion of the subject to create the cartoonized output; selecting an animated story from the database of predefined animated stories; incorporating the cartoonized output into the animated story; and outputting the animated video comprising the cartoonized output incorporated into the animated story. The method may further include selecting one or more additional features for the animated video. The method may further include displaying the cartoonized output as a preview prior to incorporating it into the animated story.

In another embodiment, the present invention includes a computer-readable medium having computer-executable instructions that when executed perform a method, comprising: receiving an image comprising a portion of a subject from a photograph or other two-dimensional depiction of the subject; cartoonizing the image to create a cartoonized output; receiving a selection of an animated story from a database of predefined animated stories; incorporating the cartoonized output into the animated story; and outputting an animated video comprising the cartoonized output incorporated into the animated story. The computer-readable medium may further include the database of predefined animated stories.

As used herein, the term "cartoonize" refers to a computer process resulting in a cartoon representation of at least a portion of a subject. Cartoonizing may be done by direct manipulation of a subject's image from a photograph (digital or otherwise) or other 2D or 3D depiction of the subject, or by generating the cartoon representation of the subject through user inputs. Even though the cartoon representation is computer-generated, the cartoon representation may be photorealistic in look and feel or the cartoon representation may be stylized in the style of the animation video.

Customized animated videos can have three dimensional (3D) representation, text, audio portion, or other aspects of the product modified for a specific individual or group. In the present description, a 3D video representation of an object refers to a representation that is created in such a way that it is intended to appear to the viewer to be three-dimensional. The creation of 3D representations has been time consuming and therefore undesirable for use by a user-generated system. The system and method of the present invention realize a solution to the time constraint limitation of the conventional systems and meet the need to create a user-friendly 3D personalized animation system.

In some embodiments, the customized animation video system and method of the present invention provides a preview feature to the user so that the user, when creating a custom 3D animated video, can view a portion of the customized animated video prior to provided additional customizing information. In this manner, the user can customize portions of the animated video after having watched a previous portion of the animated video. In one embodiment, the user may choose his, or her, own adventure by making choices in the video at predetermined times after having viewed previous portions of the video.

According to embodiments of the present invention, the customized animation video system and method of the present invention enables the user to input, verify and/or correct the pronunciation of a customized word or phrase in the video when creating the customized 3D animated video. In some embodiments, a user voice input is used to provide the correct spelling. In other embodiments, a phonetic spelling is used to provide the correct spelling.

One embodiment of the present invention is a system and interface for incorporating a 3D animated representation of an individual and/or other custom 3D animated object into an animated video without the use of a photograph or other 2D representation. These 3D representations can be viewed from any perspective and match the style of the other, predefined animated objects in the video. Further, these 3D animated representations can be incorporated into an animation program or rendering engine in a near immediate timeframe of less than ten minutes and as little as a minute or less following the input of customizing information, and then is subsequently rendered as at least part of an animated video in a seamless integration fashion. Specifically, in the present embodiment, a menu-driven interface is used to input the customizing information which is used to populate a data structure that drives a script or program that controls a content management system. Based on the data input, the content management system selects one or more predefined 3D animated components that are used to model the 3D animated representation of the individual or other custom object. Similarly, based on input data, the content management system generates data files that include the newly modeled 3D animated representation and other 3D animated objects for input into an animation program or rendering engine to layout and render an animated video.

Another embodiment of the present invention is a system and interface for creating a 3D animated representation of an individual or other custom object based on one or more photographs or other representations of the individual or object in which the 3D animated representation can be viewed from any perspective, can be generated in a near immediate timeframe of less than ten minutes and as little as a minute or less, and can be generated from predefined 3D components such that the 3D animated representation matches the style of the other objects in the animated video. Specifically, this embodiment describes a mapping process in which the original photograph or other representation is modeled to select predefined 3D animated components, in the style of the animated video, which are then used to layout and render a corresponding 3D animated representation.

FIG. 1 is a flowchart illustrating the customized animated video method according to one embodiment of the present invention. Referring to FIG. 1, a user inputs customizing information to be used in customizing an animated video (step 100). This information in the form of user-defined characteristics 102 may include, for example, information about an individual's facial features such as eye color or hair length. This would be similar to data input for many avatar generating programs available online at the websites of companies like IMVU, Yahoo, and Facebook. This is often done, for example, via an online menu system using HTML or Adobe Flash as the interface and data input tool. The user-defined characteristics 102 may also include the spelling or pronunciation of an individual's name, the names of an individual's family members or friends, the color of a personalized inanimate object, or any other information desired to customize the representation of an individual or object in the video.

The user-defined characteristics 102 are used to populate a data structure (step 104) such as an XML file, for example, which is read by a script or a program (step 106) that uses this data to select one or more predefined 3D elements and/or objects residing in a database of 3D elements 108 to generate a custom animated 3D object or a customizable object 110. The customizable object 110 is in a file format (such as FBX for example) that can be read by an animation program or rendering engine. Multiple custom customizable objects may be generated and stored in a database this way for a single animated video.

In the present description, an "object" in the video and media context refers to a data structure or a mathematical representation of a three-dimensional subject, which may be an animated subject (a person or an animal) or an inanimate subject (a vase, a cup or other things). In some embodiments, the object is described by a data structure and may include customizable elements. The object thus configured may be customized based on user-input and is referred herein as a "customizable object."

As an option, the customizable object 110 can be presented for review by the user (step 112) to give the user the option of either revising the user inputs (step 100) or proceeding to a subsequent script or program (step 116) that generates date files that will be read by an animation program or rendering engine.

The customizable object 110 is used by a content management system (step 116), which may be configured as a script or a program. The content management system may also use other 3D elements from a database of 3D elements 114 to generate date files that will be read by an animation program or rendering engine. The script that controls the content management system (step 116) at this stage may also read data regarding animation settings 118. In some cases, data relating to the animation settings may be input by the user. For example, for one of the roles in the animated video, the user may be permitted to choose among two or more characters. As one specific example of this, the user may be permitted to choose between an ogre and a dragon as the antagonist for a specific animated video, based on the user's preference. The user's choice would be used to populate the data structure 118, which would be read by the script or program of the content management system (step 116) to generate the data files to be read by the animation program or rendering engine. In the specific example cited above, this would result in one of two animated videos, identical in every way except that the antagonist would be an ogre in one case or a dragon in the other case, as defined by the data regarding animation setting 118. As other examples, the data 118 may be used to define the color of one or more objects in the animated video, define a preferred logo, define a preferred sports team, set thematic elements such as historical period, or select any other preferred object or feature selected from a list of pre-defined options. In yet another example, the data 118 may be used to define one of two or more possible storylines or endings to the animated video.

The resulting data files from the content management system (step 116) are read by an animation program or rendering engine (step 120) to create or render a custom 3D animated video 122. The animated video 122 may be created in a bit map format or other graphic file format. In the present description, rendering refers to the final process of creating the actual 2D image or animation from a prepared scene including 3D objects. More specifically, rendering is the process of using computer programs to generate an image from one or more objects. The object is a description of three-dimensional objects in a data structure. To create an animation video, several images (frames) are rendered and stitched together using a computer program. For three-dimensional animated videos, 3D rendering is used. 3D rendering refers to the 3D computer graphics process of automatically converting 3D wire frame models into 2D images with 3D photorealistic effects on a computer.

A salient feature of the customized animation video system and method is that representations of the subject are integrated seamlessly into the animated video. In the present description, a seamless integration includes the following features: (i) an image of the subject that is in the same graphic style as the rest of the animated video; and (ii) the image of the subject would be able to be viewed from any desired perspective in the animated video (for example from the front, the side, and the back) just as any other object in an animated video can be drawn or viewed from any desired perspective. Another salient feature of the customized animation video system and method is that a customized video can be automatically rendered based on objects stored in a pre-defined file structure. Modifications to the customized video can be made by simply changing the content of a file name in the pre-defined file structure. Furthermore, the customized animation video system and method may further define a series of objects in a video that are subject to customization (for example, eyes, hair and clothes of a character) as data in a specific location in a dataset and a video is customized by changing the data at the specific location of the dataset.

In some embodiments, a software program can consolidate steps 100, 102, 104, and 106 in which the user-defined characteristics are obtained and the user-defined characteristics are used directly by the program to automatically generate a 3D object by combining pre-defined 3D elements from a database. Similarly, steps 106, 110, and 116 can be consolidated by running a single script that both generates customizable objects from a database of 3D elements and also controls the content management system to generate data files that will be read by an animation program/rendering engine. In another embodiment, two or more of the databases 108, 114, 118 can be consolidated into a single database. In another embodiment, a single program could be written that consolidates all of the steps described in FIG. 1.

FIGS. 2*a* and 2*b* show one embodiment of a menu that could be used to assist the user to input customizing information about an individual's facial features. In the present embodiment, the user can choose between four different skin colors 204, 206, 208, and 210. They can also choose between three different hair styles 212, 214, and 216 as well as four different hair colors 218, 220, 222, and 224. In addition, the user can choose between three different eye shapes 226, 228, and 230 and three different eye colors 232, 234, and 236. For example, the representation of a person called an avatar, in FIG. 2(*a*), shown in box 202*a*, was generated by choosing from the menu a light skin color 204, a short hair style 212, light hair color 218, round eyes 226, and a medium eye color 234 which could be blue for example. These choices are indicated by the dashed lines surrounding the specific menu options that were chosen. The resulting avatar may represent an individual that has these facial features for example. Alternatively, the user can define a very different looking avatar shown in box 202*b* of FIG. 2(*b*) by using the same menu but choosing a darker skin color 208, a longer hair style 216, a dark hair color 224, oval eyes 228, and a dark eye color 236. Again, the choices in FIG. 2*b* are indicated by the dashed lines surrounding the specific menu options that were chosen to create the avatar in box 202*b*.

The menu shown in FIGS. 2(*a*) and 2(*b*) is exemplary and different types of menus, including much more comprehensive and complex menus, could be used to enter customizing information. For example, sliding scales or color maps can be used to select colors. Different levels of detail can also be enabled such that users who want to input only very basic custom information can do so easily and users who want to input more detailed information can enter this information through additional menu options. Menu options can include any customizing information that the user might want to enter. In the case of creating an avatar, for example, this might include options for glasses, moustache, beard, birth marks, scars, face shape, body shape, height, clothing, a wheelchair, or any other information that a user might want to enter about the character.

A character's features may be chosen by the user to closely resemble a real person, an enhanced version of a real person, or a made up person. In addition, the character might be made to include a combination of some features that match a real person and some features that match a character or object. FIGS. 3(*a*) to 3(*c*) illustrates different animated images that can be generated using the menu interface shown in FIGS. 2(*a*) and 2(*b*). FIG. 3(*a*) shows an example of an image from an animation 302 in which a character 304 has features that resemble a real person except for the nose 306 which is elongated. This could be used, for example, to have the child play the role of the lead character Pinocchio in the popular children's story Pinocchio. FIG. 3(*b*) shows another example of an image from an animation 310 in which a character 312 has features that resemble a real person except that the character 312 has the body of a giant. FIG. 3(*c*) shows another example of an image from an animation 320 in which an avatar 322 has the facial features of a person but the body of a bus. This could be used, for example, in telling a story about a bus in which a child plays the role of the bus.

One embodiment of the present invention is user interface driven facial expression synthesis. A user driven interface is used to model a personalized face to show a range of emotions using the expression synthesis protocol of the present invention. The expression synthesis uses inputs from the user about the personalized character and from a database showing facial expressions typically mined by a recursive algorithm driven by user input and cumulative facial expressions to create an aesthetic facial animation using facial animation tools. The user's responsive input to visual and/or word prompts creates a virtual emotion map that is a synthesis of human emotions. This is shown in the flow chart of FIG. 3(*d*) in which the user is shown one or more characters with one or more emotion settings 330. An emotion setting is associated with one or more parameter settings that affect the look of a character and are stored in a database 332. For example, the emotion setting "happy" may be associated with one or more parameter settings for the mouth that has the mouth turned upwards in a smile, one or more parameter settings that have the eyebrows raised, and other potential parameter settings. In general, there will be one or more emotion settings, each of which is associated with multiple parameter settings. The user provides feedback 334 that is used to change the parameter settings associated with a given emotion setting. This can be shown to the user again for further input if desired.

Once the face of a character has been modeled, the remainder of the character can be created to correspond to the facial model. The character's gender, physical parameters, age, ethnicity, body type can be selected. The character can be animated to correspond to the emotions selected in the preceding process. A character's emotions as expressed through the expression synthesis can be correlated to the body and its motion. For instance a sad character may have a slumping posture and slow motion and a happy character may have expressive movements and erect posture. The cumulative representation of the character's face, body and motion create the personalized persona. It can all be driven initially by the facial expression synthesis. The following discussion illustrates how to input and manage character data.

FIG. 4 is a flowchart illustrating the customized animated video method according to an alternate embodiment of the present invention in which a photograph or other representation of an individual or a subject is used as the initial input to the customized animation video system. Referring to FIG. 4, a photograph or other representation of the subject is supplied to the customized animation video system as user input (step 400). This representation of the individual or subject can be accepted through a Web interface, downloaded directly from a camera, or otherwise obtained. The representation of the individual or subject is analyzed to quantify specific features that will be used to customize an animated representation of the individual or subject (step 402). For example, facial recognition or feature recognition algorithms may be used to identify features such as eyes, mouth, and hair and quantify parameters associated with those features such as eye color, mouth shape, and hair length and style. Some common feature recognition algorithms include Eigenface, Fisherface, the Hidden Markov model, and neuronal motivated dynamic link matching.

Once the specific parameters have been quantified for the features of interest, an algorithm is run (step 404) to find the closest match between features of interest and corresponding, predefined animated 3D elements in a database 406. For example, given the color and dimensions of an eye as quantified by a feature recognition algorithm, a matching algorithm can be used to find the closest match to that eye from a set of predefined animated eyes. An example of such a matching algorithm is $$Q = \sum_{i=1}^{n} w_i f(P_i - A_i)$$

In which the quality of the match (Q) for a specific feature is represented as the weighted sum, over the number of parameters being measured for that feature (n), of a function $f$ of the differences between the parameters ($P_i$) in the picture or other representation and the corresponding parameters ($A_i$) in the predefined animated feature being compared, where i denotes the parameter number. For example, this function $f$ could simply be the absolute value of the difference between a parameter ($P_i$) and the corresponding parameter ($A_i$):

$$f(P_i - A_i) = |P_i - A_i|$$

The weighting factor ($w_i$) represents the importance of the match for a particular parameter i to the overall match of the feature, and may itself be a function of the difference between the parameter ($P_i$) in the representation and the corresponding parameter ($A_i$) in the predefined animated feature being compared.

The weighting of the factors ($w_i$) can be refined by a neural network or "mechanical turk" mechanism in which users observe a photo and two or more cartoonized representations of the photo using different weighting factors ($w_i$) for one or more parameters i, and then feed back to the system which cartoonized representation is the closest match to the photo based on the users judgment.

Once the predefined 3D elements have been identified that best match the corresponding features of an individual or a subject based upon an analyzed photograph or other representation, this information is read into a script or program (step 410) that combines the best-matching, predefined 3D elements from the database 406 to form a custom 3D object or customizable object 412 representative of the original photograph or other representation of the individual or subject. The method can then continue at step 116 of FIG. 1 where the content management system generates data files of the customizable objects and the animation settings. The data files are read by the rendering engine (step 120) to generate the custom 3D animated video 122.

By generating a 3D animated representation of an individual or other custom object using the mapping process described above, rather than directly manipulating a photograph or representation of the individual or object, the 3D animated representation can be generated based on a single photograph or other representation of the individual or subject, may be viewed from any perspective, may be generated in a near immediate timeframe of less than ten minutes and as little as a minute or less, and may be generated from predefined 3D components such that the 3D animated representation matches the style of the other objects in the animated video.

Based on the description of the process and resulting custom 3D object in FIG. 4, it will be evident to one skilled in the art that variations of the process shown in FIG. 2 can be used to generate a similar custom 3D object. As a specific example, referring to step 402, the identification of one or more features and/or quantification of one or more specific parameters associated with those features could be done manually by the user rather than by running an algorithm on the representation to identify features and quantify specific parameters associated with those features as described above. As another example, referring to step 404, an algorithm can be run to determine two or more of the closest matches between pre-defined 3D elements from a database and the features of the representation, and the user can then select manually from among the two or more closest matches rather than have the algorithm determine the single best match as described above.

Figure 5:
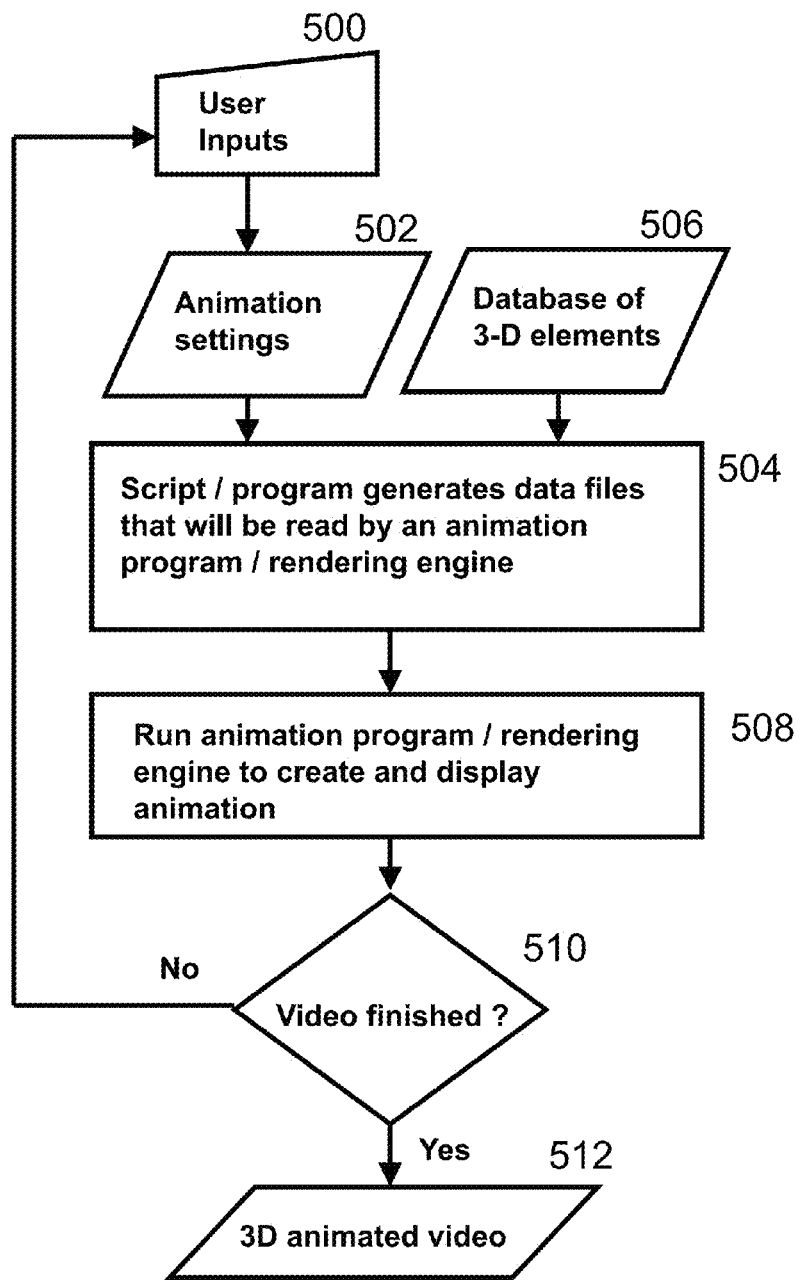
FIG. 5 is a flowchart illustrating the customized animated video method according to an alternate embodiment of the present invention.

FIG. 5 is a flowchart illustrating the customized animated video method according to an alternate embodiment of the present invention. Referring to FIG. 5, user inputs are used to at least partially populate a data structure of animation settings 502 at one or more points during the animated video development (step 500). These animation settings 502 in turn are read by the content management system, which is a script or a program, that generates data files (step 504) that will be read by an animation program or rendering engine. The content management system then populates the data files from a database of 3D elements 506 which may or may not include customizable objects.

After rendering of at least a portion of the animated video, the portion of the animated video may be displayed to the user (step 508) either in real time or at specific, predefined times in the animated video. At predefined times a decision is made as to whether or not the video is finished (step 510). The video would generally be finished at a predetermined point corresponding to the ending of a story but the point at which the video is finished could also be specified by the user if desired.

If the video is not finished at step 510, user inputs are solicited (step 500) and used to at least partially populate a data structure of animation settings 502 which in turn are read by the script (program) of the content management system that generates data files (step 504) that will be read by an animation program or rendering engine to generate at least a portion of the animated video to be displayed to the user (step 508). Generally, this would be the portion of the animated video that naturally follows a portion of the animated video viewed by the user immediately prior to providing the most recent user inputs (step 500).

If the video is finished at step 510, then one or more portions of the animated video based on user inputs are saved as a rendered 3D animated video 512. Generally, all of the portions of the animated video based on user inputs would be concatenated to form a single 3D animated video file. In this case, the single 3D animated video file could have been built up from a series of animated video segments, each of which was customized by the user after viewing the prior segment. This process allows the user, for example, to make choices during the telling of an animated story that would impact subsequent scenes in the story. The customized rendered files could be assembled to form a single animated movie file.

Based on the description of the process and resulting 3D animated video in FIG. 5, it will be evident to one skilled in the art that variations of the process shown in FIG. 5 can be used to generate a similar 3D animated video. As a specific example, a program could be developed to accept user inputs of animation settings directly and subsequently create and display the animation. This eliminates the need to store the animation settings in a data structure 502 and also eliminate the need to generate separate data files to be read by the animation program 504 as described above.

Animations generally have a fixed audio track, with dictation by predetermined storytellers or characters, generally referred to as the "voice talent." The voice talents generally record a script which is fixed for a given animation.

It would be desirable to personalize an animation by enabling a user to provide the voice talent for some or all of the animation in their own voice. It would sometimes be desirable for an individual to provide the voice talent an entire animated story or sometimes desirable to for an individual to provide the voice talent for one or more segments of an animation that could be pieced together or used separately. Enabling a user to provide the voice talent for an animation provides a higher level of customization or personalization than exists today and can be used to make the animation more compelling as a form of entertainment or as an educational tool. For example, it allows animations to contain voices that are familiar, and therefore more pleasant, to the listener. It also allows for different languages and different accents to be incorporated into the animation. It would also be desirable to enable a user to provide sounds besides their own voice for an animation, such as a familiar dog bark or cell phone ring tone for example.

Figure 6A:
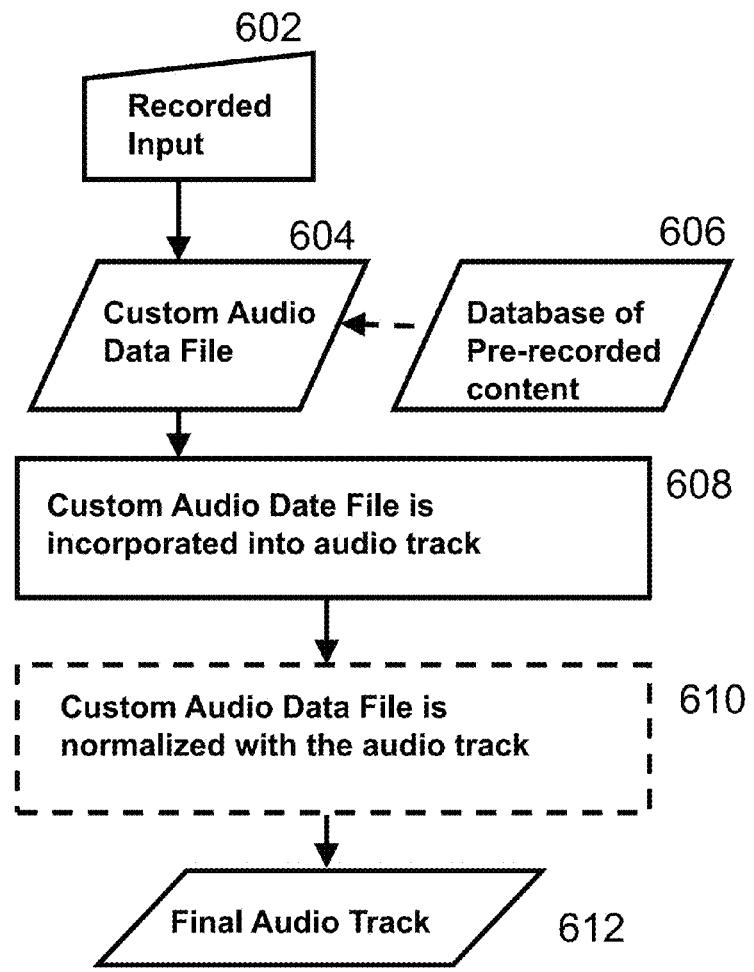
FIG. 6A is a flowchart illustrating a method for allowing a user to provide the voice talent or custom sound for a pre-defined animation or segment of an animation according to one embodiment of the present invention.

FIG. 6A is a flowchart illustrating a method for allowing a user to provide the voice talent or custom sound for a predefined animation or segment of an animation according to one embodiment of the present invention. Referring to FIG. 6A, the method includes making a recording of the custom voice or sound (step 602) using a device such as a microphone. The recording results in a custom audio data file 604. Alternatively, custom audio data can be selected from a database of pre-recorded content 606 by the user or automatically by the system. In one embodiment, a list of pre-recorded audio files, possibly searchable, is provided to the user to choose from. The system can readily allow the user to preview the custom audio by providing an interface with a link to the pre-recorded audio file. This custom audio data file is incorporated into the audio file of the animation or animation segment (step 608). In another embodiment, a portion of a pre-recorded audio track is replaced by first splitting the audio track into segments and then replacing one or more of the segments with a custom audio data file. This is done by concatenating some of the original audio track segments with the custom audio data file. This can be done by using one of many audio editing programs such as the open source software SoX (Sound Exchange).

Once the custom audio data file has been incorporated into the animation audio file, the custom audio data file can then be normalized to the rest of the audio file (step 610). This is optional but generally provides better overall audio quality. Normalization refers to the process of editing one or more sections of the audio track in order that the custom word, phrase, or sound is more smoothly integrated into the prerecorded portion of the audio track. For example, the volume or tone of the customized portion of the audio track can be manually or automatically adjusted to more closely match the prerecorded portion of the audio track. This editing can be accomplished using readily available software and algorithms. For example, software such as SoX, Audition by Adobe Systems, or Sound Forge by Sony can be used to perform this type of editing. The custom data file may represent the entire audio file of the animation, in which case normalization may not be required. This process results in a final, customized audio track 612.

FIG. 6B shows an example frequency vs. time plot of an audio track segment that is being customized according to one embodiment of the present invention. A pre-recorded audio track is generated with one or more gaps of a specific length incorporated at specific times during the audio track. FIG. 6B(i) shows a portion of an audio waveform as a function of time, shown along the top axis, with a gap in the waveform, highlighted between dashed lines, representing a gap in the audio track. This audio track may be in the form of a ".wav" file, for example. A custom word, phrase, or sound can then be inserted into the audio track as shown in FIG. 6B(ii). This custom word, phrase, or sound may also be in the form of a ".wav" file, for example. FIG. 6B(iii) shows the audio waveform from FIG. 6B(ii) after it has been normalized to more closely match the audio characteristics of the custom word, phrase, or sound with those of the prerecorded audio track.

FIG. 7 is a flowchart illustrating a method which allows a user to verify and/or correct the pronunciation of a customized word or phrase in a video according to one embodiment of the present invention. Referring to FIG. 7, the user inputs information regarding audio content to be customized (step 700). For example, the user may type or speak his or her name. This information is used to populate a custom audio content data structure 702. A script/program is used to compare the custom audio content data structure 702 populated by the user with a predefined database of audio content 706 and to determine potentially matching content (step 704). In the case of text input, potentially matching content could include different pronunciations of the word entered, for example. As a specific example, if the user entered the name "Lea," potentially matching content might include audio files with the phonetic pronunciations ('Lei:ɔ) and ('Li:ɔ). As another specific example, the name Michael could be a potential match with variations on that name such as Mike or Mikey. As another example, the user could enter the text using phonetic spelling and potential matches could be determined based on phonetic proximity. In the case of verbal user input, potentially matching content could be determined using any one of a number of speech recognition algorithms such as the Hidden Markov Model, Dynamic Time Warping, or others. In this case, the user could verbally input the audio content using a computer microphone, telephone, or similar device and the verbal input would be recorded in an audio file, such as a ".wav" file for example.

Typically, the predefined database of audio content 706 would match the style and sound of the rest of the audio content in the video. For example, it could be narrated by the same narrator as the rest of the audio content in the video.

Once potentially matching audio content is determined, it may be reviewed by the user (step 708). One way this can be accomplished is by listing the potential matches and allowing the user to select and listen to each potential match by opening a ".wav" file, for example. The user then determines if any of the potentially matching audio content is an acceptable match to the intended customized word or phrase (step 710). If an acceptable match is identified, it is used to at least partially populate a data structure of custom audio content 720. This custom audio content can then be either manually or automatically inserted into an audio track of an animated video. If the user determines that no acceptable match has been identified, it is then determined whether user-generated customized audio content will be enabled for the specific customized word or phrase in question 712.

If user-generated customized audio content is not enabled for the specific customized word or phrase in question, it may be determined that it is not possible to implement the specific customized word or phrase in question and the process is terminated (step 714). In this case, default audio content such as the words "the child" could be used as an alternative to the child's name, for example. Alternatively, user inputs may again be solicited (step 700) to find an alternate customized word or phrase.

If user generated customized audio content is enabled for the specific customized word or phrase in question, the original user inputs (step 700) or new user inputs (step 716) can be translated to create new customized audio content 718 which in turn can be used to at least partially populate a data structure of customized audio content 720. The translation of the user inputs to create new customized audio content 718 can be accomplished in a number of ways. For example, the narrator of the story can listen to the user generated inputs and record new customized audio that matches the user generated inputs. This new customized audio can be added to the database of audio content. As another example, the user may type the phonetic spelling of the new, user-generated customized audio content which can then be translated into an audio file by concatenating prerecorded phonemes. This new customized audio file can be added to the database of audio content. As another example, the user may record the new customized audio contents directly into an audio file. This new, user generated customized audio content can be added to the database of audio content.

As another example of a way to translate user inputs to create new customized audio content, the user may record an audio file which is then modified by a voice changing algorithm, such as those used in MorphVOX software from Screaming Bee or AV Voicechanger Software from Avnex, Ltd., in order to more closely match the voice characteristics of the prerecorded audio track or a portion thereof. This modified audio file can then be used as customized audio content and can be added to the database of audio content. Conversely, voice changing algorithms can be used to modify the prerecorded content of the animated video to more closely match the voice of the user, given a sample of the user's speech. Voice changing algorithms can also be used to automatically modify audio content to provide appropriate audio characteristics for the context in which it is being used. For example, audio content can be modified by voice changing algorithms to sound like a question, or to be emphasized in an exclamation.

Based on the description of the process and resulting custom audio content in FIG. 7, it will be evident to one skilled in the art that variations of the process shown in FIG. 7 can be used to generate a similar custom audio content. As a specific example, the process could be modified to eliminate the review by the user of the potentially matching audio content from the database (step 708) and simply assume that the program used to match the user input audio content with the existing database of audio content (step 704) yields an acceptable match. In this case, the process would move directly from step 704 to step 720, skipping all steps in between and using the matching audio content from the existing database as the custom audio content without review. As another example, all of the steps prior to step 716 could be skipped and the process could be modified to start by accepting new user inputs 716 which are translated to create new customized audio content 718 which in turn can be used to at least partially populate a data structure of customized audio content 720.

Hours of compilation go into a typical animation project, and each animation is typically fixed in what it presents due to the high cost of re-compiling the animation in order to make any changes. For that reason, user viewing experiences for animation are not changed today to accommodate user preferences.

It would be desirable to allow customization of an animated sequence by allowing a user to add, change, or remove one or more assets such as, but not limited to, terrain, characters, props, lights, backgrounds, etc. and produce the result with the new, changed, or removed assets as a part of the animation.

Figure 8A:
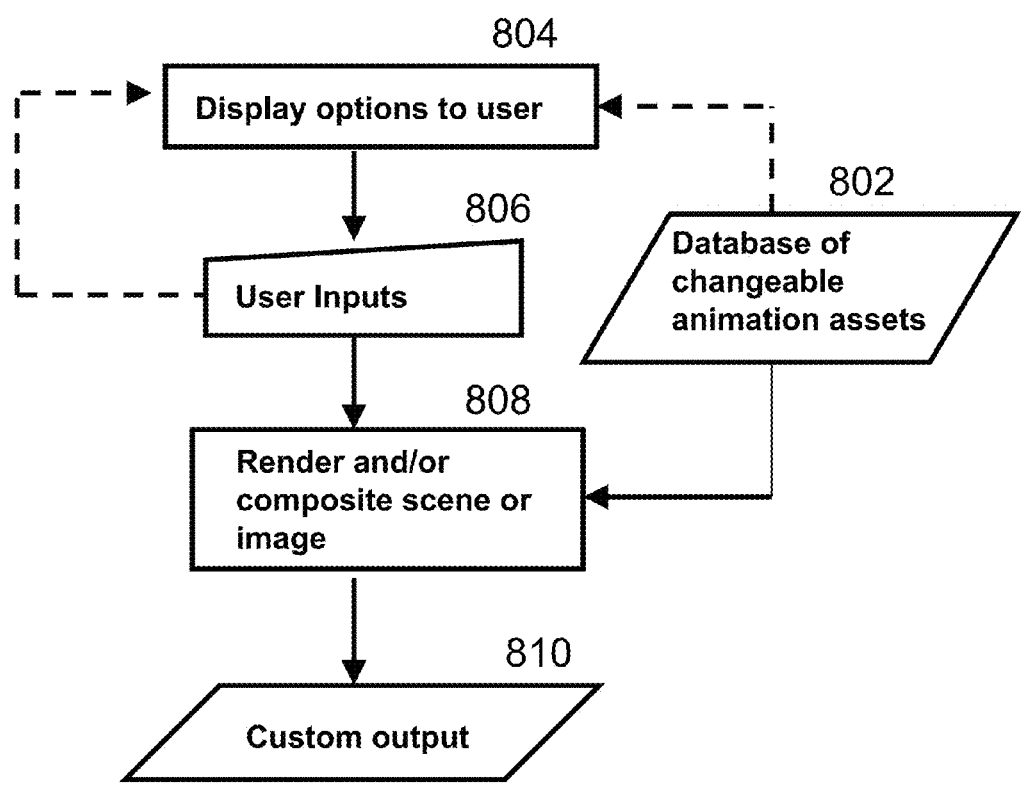
FIG. 8A is a flowchart illustrating a customized animation video method according to one embodiment of the present invention.

FIG. 8A is a flowchart illustrating a customized animation video method according to one embodiment of the present invention. Referring to FIG. 8, the method enables a user to customize one or more assets of a pre-recorded animated sequence and produce a final rendered/composited animated sequence according to the choices made without interacting directly with the animation software. A user can customize one or more assets in the story to their liking and receive a new animation based on their choices.

The changeable animation assets for an animation sequence are stored in a database 802. These animation assets can be animated objects, images, motions, sound files, or any other item that is used in generating an animation. The changeable animation assets can be pre-defined and/or the user can create or import new changeable animation assets to be placed into database. In one embodiment, the changeable animation assets are displayed to the user t (step 804). The user selects which changeable asset or assets they would like to use for the animation sequence (step 806). The selected personalized assets are used to render and/or composite an animation sequence (step 808). The final custom animation sequence 810 can then be viewed by the user.

Figure 8B:
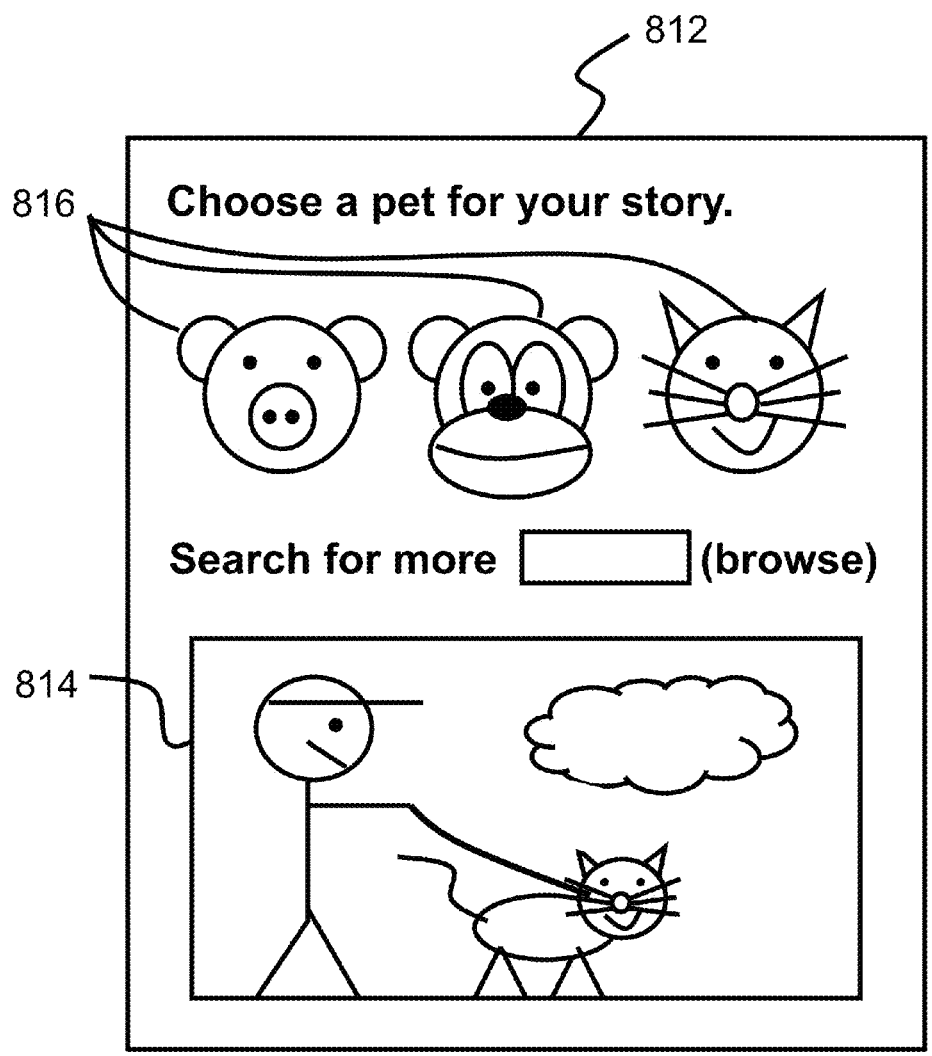
FIG. 8B shows an example of a user interface which may be used in the method of FIG. 8A.

FIG. 8B shows an example of a user interface which may be used in the method of FIG. 8A. Referring to FIG. 8B, a user interface 812 may be provided on a device such as, but not limited to, a computer screen, gaming console, mobile phone, or other electronic device. The device portrays a scene, frame, or other embodiment of an animated sequence 814 which has certain or all elements that can be changed. The user can add, change, or remove one or more assets in the scene selected from a group of one or more assets 816. The assets can be animated objects, images, motions, sound files, or any other item that is used in generating an animation. The assets can be displayed in a number of ways, for example as a written list, as images, or as icons. The user can select the assets through a number of interfaces, including keyboard, joystick, verbal commands, or touch panel for example.

The user may save preferences with respect to their personalized content and/or save personalized content that they have created or stored in a database of changeable assets. This may be done, for example, by creating an account that stores these preferences. This allows the user to set up standard choices or rules for changeable assets. For example, if the asset is an animal, the user can chose to always make it a specific dog asset. Of course, these standard choices or rules and be changed by the user either by changing their overall preference or by changing the asset they chose for a specific instance in using the process.

Creation of a 3D character or object for use in animation is typically done by using 3D modeling software like Maya or Poser. In order to change the 3D object, the object must be changed in the original software in which the object was created or in software in which a compatible format can be imported.

It would be desirable to allow a user to modify a 3D object's properties or elements by manipulating a 2D representation of that object which would be less complicated and provide an easier interface and quicker feedback to the user. In addition, 2D objects are typically easier to assemble, render or otherwise create compared to 3D objects. Allowing a user to create, modify, or customize a 2D object, which acts as a representation of a 3D object, provides an easier and faster approach to creating, modifying, or customizing a 3D object than requiring a user to interface with a 3D object directly.

Figure 9A:
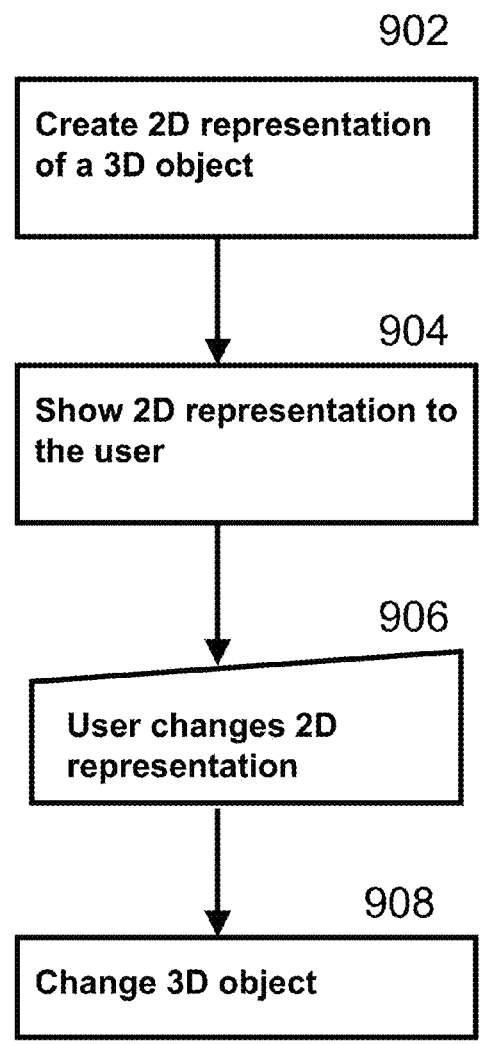
FIG. 9A is a flowchart illustrating a method to customize a 3D animation object using a 2D representation according to one embodiment of the present invention.

FIG. 9A is a flowchart illustrating a method to customize a 3D animation object using a 2D representation according to one embodiment of the present invention. Referring to FIG. 9A, the method allows a 2D representation of a real or imaginary object to be customized. Then the result of the customized 2D representation is applied to the object in such a manner that it is later used in an animation, including an animated video, a video game, still images, or other 3D animation.

In the present embodiment, the method includes creating a 2D representation of an object in which the user can change parts of the 2D representation (step 902). For example, the hair color might be changeable to one of four different colors: brown, black, red or blonde. The system shows the 2D representation to a user (step 904) and allows the user to change one or more parts or attributes of the 2D representation via an input interface (step 906). Changing one or more parts or attributes of the 2D representation can be done manually or through scripts using a range of graphics tools such as Photoshop that allow one to (i) identify the portion of the 2D representation that are changeable, (ii) define the parameters that can be changed, and (ii) provide an interface to the user to change and view the 2D representation of the object. The portions of the 2D representation of the object that are changeable and the parameters that can be changed are mapped to analogous changes in a 3D representation of the object. When changes are made in the 2D representation of the object, these changes are applied to a 3D representation of the object (step 908). This can be done, for example, using Mel scripts in Maya. The changed 3D representation of the object can then be used in an animation or otherwise.

For example, FIG. 9B shows a 2D representation of a person and FIG. 9C shows a 3D representation of the same person.

Allowing a user to modify a 3D object's properties or elements by a 2D representation allows the user to make the modifications on an interface that is completely independent of the original creation method of the 3D object. This can greatly simplify the modification of the object for the user.

In addition to customizing objects and audio in an animation, it would be desirable for a user to be able to customize the storyline of an animation. This provides a more compelling entertainment or educational experience. Animated videos today contain only one pre-determined story line.

Figure 10A:
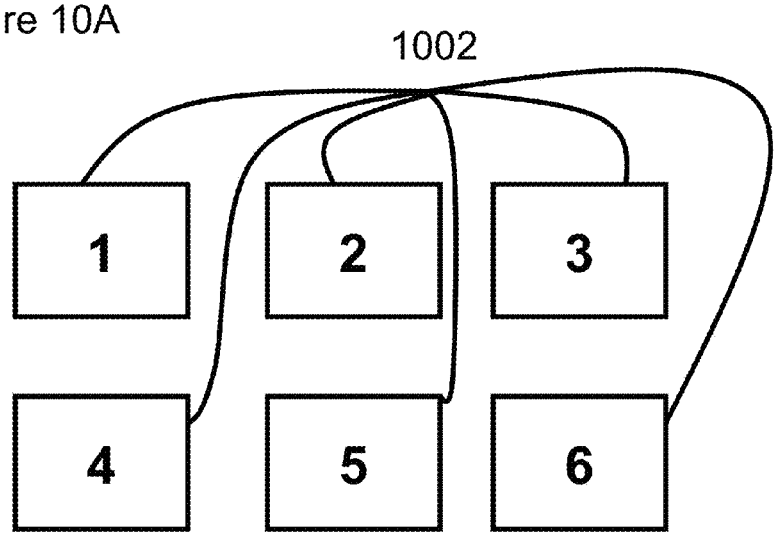
FIGS. 10A and 10B illustrate a method to enable a user to change the storyline of an animation story according to one embodiment of the present invention.
Figure 10B:
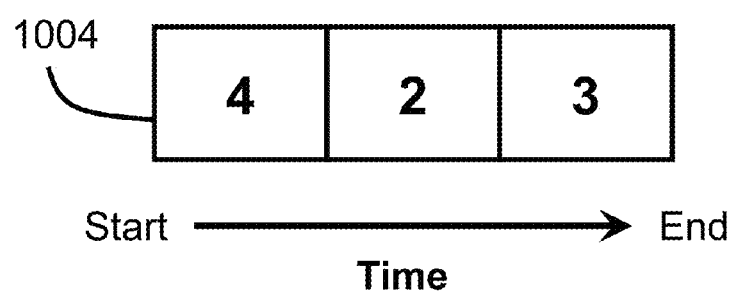

FIGS. 10A and 10B illustrate a method to enable a user to change the storyline of an animation story according to one embodiment of the present invention. Referring to FIG. 10A, a system for enabling a user to choose one or more different storyline segments in order to create their own animated video is shown. The user is shown multiple animation story segments 1002, in this case numbered 1 through 6. An animation story segment means a finite duration of an animation. The animation story segments may or may not be personalized and may be of varying lengths. The user selects one or more animation segments and defines the order of these one or more animation segments to create an animation.

FIG. 10B shows schematically an animation sequence 1004 in which the user has selected to view animation segments 4, 2, and 3 in that order to create a new animation.

Figure 10C:
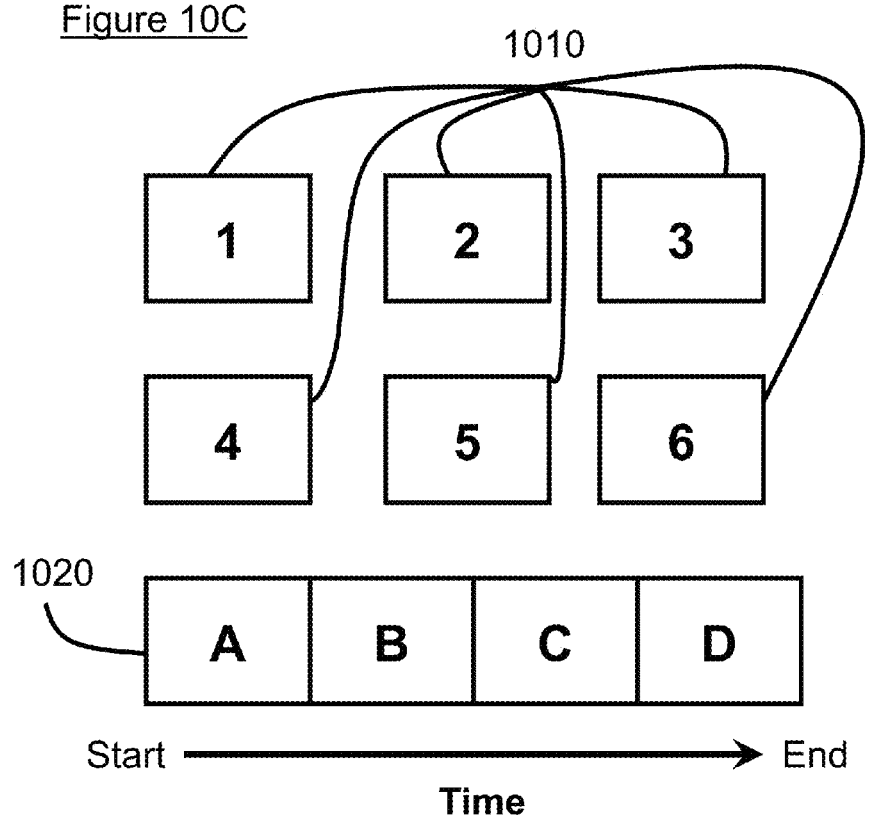
FIGS. 10C and 10D illustrate a method to enable a user to change the storyline of an animation story according to an alternate embodiment of the present invention.
Figure 10D:
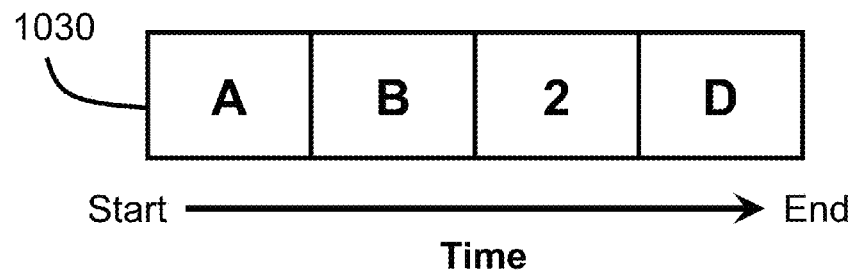

FIGS. 10C and 10D illustrate a method to enable a user to change the storyline of an animation story according to an alternate embodiment of the present invention. Referring to FIG. 10C, the user is shown both (i) one or more animation segments 1010, in this case numbered 1 through 6, and (ii) a base storyline 1020, which itself is composed of one or more animation segments, in this case segments A, B, C, and D. The user can replace animation segments in the baseline animation with other animation segments to create a new animation.

FIG. 10D shows schematically an animation in which the baseline animation segment C has been replaced with the animation segment 2 to create a new animation 1030.

Similarly, users may select themes for animations to create new animations. For example, a base storyline could contain a school setting, and additional story components/themes could be a math component, an English component, and a moral component. After choosing these, the system will then compile all components/themes together and produce a single animated story. Another example of selecting a theme is selecting a color scheme for the animation.

In addition to being used to generate a 3D animated video, the custom 3D animated representations created using the processes described above, along with other 3D animated objects if desired, can be used as images for a book, comic book, magazine or other printed media. In addition, these 3D animated representations and objects can be used to create other customized products, including but not limited to bags, mugs, shirts, caps, or other clothing. Similarly, frames or images from a customized 3D animated video can be captured for use in printed media or customized products. Similarly, the custom audio content created using the processes described above, along with other audio content if desired, can be used to create other customized products such as audio books or customized music for example.

Based on the description of the process and resulting custom 3D animated video given above, it will be evident to one skilled in the art that variations of the above process can be used to generate a similar custom 3D animated video.

In one embodiment of the present invention, as illustrated in FIG. 11A, a system 1100A, which may be embodied in a software application, is provided for creating an animated video incorporating cartoonized elements. The software application may be a single application or a suite of several standalone applications that are configured to communicate with one another. The software application(s) may be configured to operate on a computer or similar electronic device and/or may operate through a user interface with a network connection, such as over the Internet.

The system 1100A may include a cartoonizing application 1101A with an input 1103A from a user and an output 1104A providing the customizable object. The cartoonizing application 1101A may also access a database of objects 1108A. The cartoonizing application 1101A may be a commercially available product, a combination of commercially available products, a modified version thereof, or any other application that is configured to perform the cartoonizing process described herein. By way of example, some commercially available products that may be used as cartoonizing applications in connection with various embodiments of the present invention include, but are in no way limited to, Adobe Photoshop® software, CorelDRAW® graphics software, Comic Life software, Microsoft Paint™, Microsoft Acrylic™, and many others that will be readily appreciated by those of skill in the art, as well as combinations or variants of the aforementioned products.

The system 1100A further includes a content management application 1110A which receives the customizable object 1104A as inputs and generates data files of an assembly of objects for the rendering engine. The content management application 1110A may access a database of objects 1108A and may also receive inputs from a data structure 1105A defining animation settings which may be provided by the user.

The system 1100A further includes an animation application 1102A which receives the data files from the content management application 1110A as input and generates an animation output 1106A. The animation application 1102A may be a commercially available product, a combination of commercially available products, a modified version thereof, or any other application that is configured to perform the animation process described herein. By way of example, some commercially available products that may be used as animation applications in connection with various embodiments of the present invention include, but are in no way limited to, Mirage™ software (available from Bauhaus Software, Inc.; San Antonio, Tex.) Maya® animation software (available from Alias Systems Corp.; Toronto, Canada), Harmony™ and Opus™ 2D animation software packages, KToon™ 2D animation toolkit, and Flash MX™ 2004 and Animo™ software package (available from Cambridge Animation Systems; Cambridge, England).

One of skill in the art will readily recognize other products and applications that may be used to achieve the functionality of the cartoonizing application 1101A, the content management application 1110A, and the animation application 1102 of the present invention. Such products and applications are considered to be within the scope thereof.

In some embodiments, the input 1103A to the cartoonizing application 1101A includes a photograph or other 2D depiction of a subject. The cartoonizing application 1101A may be configured to accept any number of electronic file formats for the photograph or other 2D depiction of the subject (e.g., .jpg, .png, .gif, .bmp, .pdf, etc.). In other embodiments, the input 1103A may be user input data defining features of a subject, such as an avatar.

In some embodiments, the cartoonizing application 1101A provides an array of graphics editing options to a system user; enabling the user to modify the 2D depiction of the subject. Any number of graphics editing options can be incorporated in the cartoonizing application 1101A, as will be readily appreciated by those of skill in the art. The cartoonizing application 1101A may include a user selection operation whereby a system user selects a portion of the photograph or other 2D depiction of a subject to be cartoonized (e.g., if the subject is a person and the photograph depicts a full body image of the person, a portion selected for cartoonizing may be the person's face). Additionally, the user may have the option of adjusting the size of the 2D depiction of the subject or portion thereof (e.g., smaller, thinner, wider, etc.), as well as the options of adjusting skin tones, selecting eye color, and the like. A practically unlimited number of such graphics editing options may be included in the cartoonizing application 1101A in connection with alternate embodiments of the invention. The graphics editing options may be implemented by a system user by selecting values with radio buttons, selection dialogs, and the like.

Moreover, the cartoonizing application 1101A may be configured such that a system user implements a graphics editing operation (e.g., a change in eye color), and the results of that editing operation are displayed as a preview via output 1114A. The output 1114A of the cartoonizing application 1101A is a cartoonized version of the photograph or other 2D depiction of the subject or portion thereof. The output 1114A of the cartoonizing application 1101A may be in electronic communication with the content management application 1110A. In an alternate embodiment of the present invention, the output 1104A may additionally or alternatively include a print feature that enables a system user to create a printed version 1114B of the cartoonized version of the photograph or other 2D depiction of the subject or portion thereof. Any printing device in electronic communication with the cartoonizing application 1101A may be used in connection with this aspect of the invention, as will be readily appreciated by those of skill in the art. In a still further alternate embodiment of the present invention, the output 1104A may additionally or alternatively include a view feature 1114A that enables a system user to view the cartoonized version of the photograph or other 2D depiction of the subject or portion thereof. Any viewing device may be used in connection with this aspect of the invention, as will be readily appreciated by those of skill in the art; for instance, a computer monitor or other display apparatus in electronic communication with the cartoonizing application 1101A.

The animation application 1102A may include a database of predefined animated stories 1107A. In operation, the animation application 1102A integrates the customizable object 1104A seamlessly into predetermined locations in the one or more predefined animated stories from the database 1107A to create an animated video with cartoonized elements. Although this can be readily accomplished in a number of ways, in one embodiment of the present invention, each predefined animated story includes a template with positions marked throughout for character faces or other components of the animation. Specifically, a predefined animated story may be comprised of a series of frames (1-n) each with a standard set of Cartesian coordinates. Thus, a template may indicate that, at a particular frame, and a specified set of coordinates and geometric shape values (radius, diameters, etc.), the customizable object is positioned. The template may provide for a wide array of additional features to further modify or select a particular cartoonized version, such as an indication of a particular facial position type (e.g., viewed from the left or right side), a palette for skin tone values, and many others.

Rather than being used in a single frame, the customizable object is used throughout the selected animated story for that character (or characters), with various viewpoints, expressions, and the like, as is necessitated by the particular story and the animation scheme that illustrates it. The customizable object is seamlessly integrated into the animated story.

In an alternate embodiment, multiple faces can be input to the system 1100A such that, for example, the face of each member of a family in a photograph may be cartoonized and thereafter become the face of a different character in a story. In a still further alternate embodiment, additional aspects of the subject may be included from the photograph or other 2D depiction, such as the user's body, such that the characters in the stories take on these features of the subject as well (e.g., body type, height, hairdo, etc.).

The animation setting input 1105A may further include a series of user selection operations whereby a system user selects a particular predefined animated story from the database 1107A. In alternate embodiments of the present invention, the series of user selection operations may also include a user selection of other character parameters for the story that relate to the predefined animation and not to the manipulation of the 2D image (e.g., the character parameters may include height, weight, name, etc. of each character). The input 1105A may also allow the user to select the format of animation output 1106A that is desired (e.g., selection of storage media for the finished product, selection of print parameters and format for printing some or all of the animated video).

The animated video with cartoonized elements may be output from the system 1100A through the animation application output 1106A. The system 1100A may be configured to store the animated video with cartoonized elements directly onto a digital versatile disc (DVD) or hard disk drive (HDD) or another conventional electronic storage medium. The system 1100A may also be configured to output the animated video through an electronic communications channel, such as via upload to the Internet or as an attachment to an electronic mail message. The output 1106A may alternatively or additionally be configured for any number of output formats (e.g., pal/ntsc, 35 mm, Flash, etc.). In an alternate embodiment of the present invention, the output 1106A may additionally or alternatively include a print feature that enables a system user to create a printed version 1117A of some or all of the animated video with cartoonized elements. Any printing device in electronic communication with the animation application 1102A may be used in connection with this aspect of the invention, as will be readily appreciated by those of skill in the art. A system user may, for instance, print some or all of the frames of a particular animated video. In one embodiment, the output 1106A may be formatted for printing some or all of the frames of a particular animated video in a comic book type format.

Figure 11B:
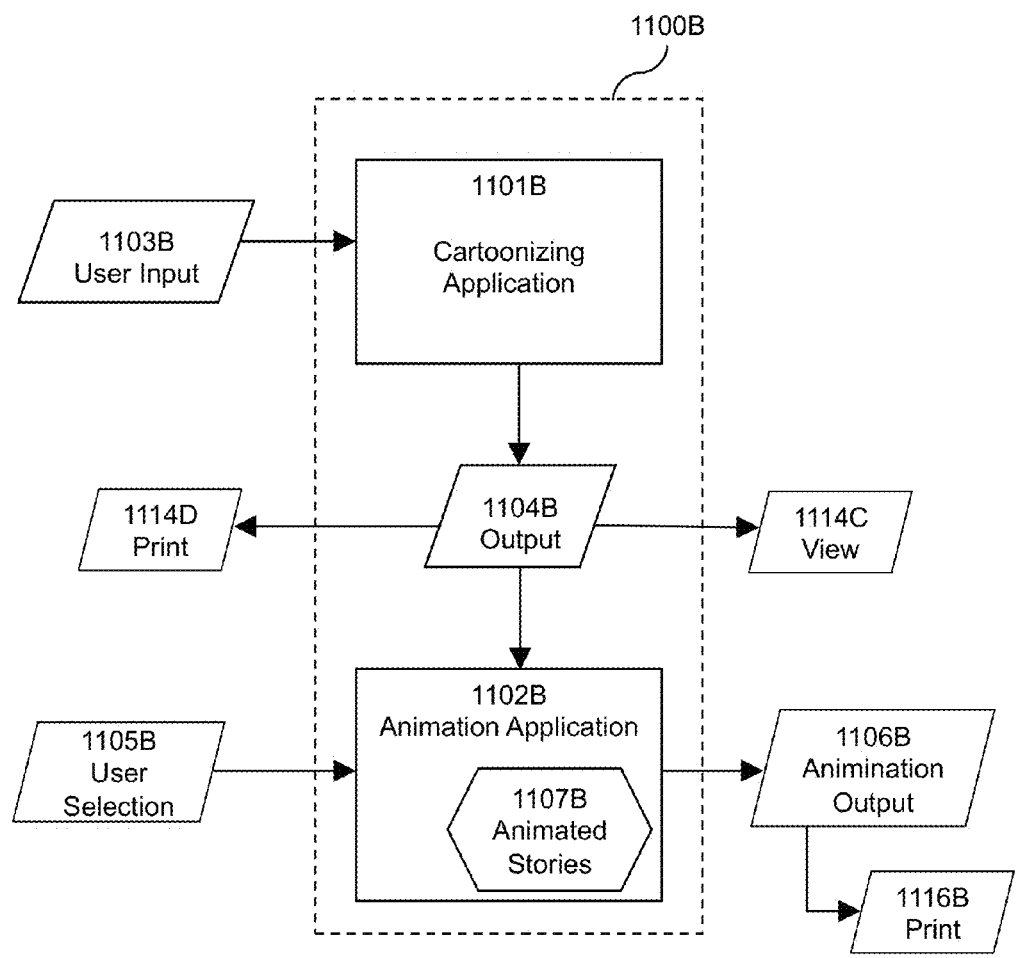
FIG. 11B illustrates a customized animation video system according to an alternate embodiment of the present invention.

In another embodiment of the present invention, as illustrated in FIG. 11B, a system 1100B, which may be embodied in a software application, is provided for creating an animated video with cartoonized elements. The software application may be a single application or a suite of several standalone applications that are configured to communicate with one another. The software application(s) may be configured to operate on a computer or similar electronic device and/or may operate through a user interface with a network connection, such as over the Internet.

The system 1100B may include a cartoonizing application 1101B with an input 1103B and an output 1104B. The cartoonizing application 1101B may be a commercially available product, a combination of commercially available products, a modified version thereof, or any other application that is configured to perform the cartoonizing process described herein. By way of example, some commercially available products that may be used as cartoonizing applications in connection with various embodiments of the present invention include, but are in no way limited to, Adobe Photoshop® software, CorelDRAW® graphics software, Comic Life software, Microsoft Paint™, Microsoft Acrylic™, and many others that will be readily appreciated by those of skill in the art, as well as combinations or variants of the aforementioned products.

The system 1100B may further include an animation application 1102B with an input 1105B and an output 1106B. The animation application may be a commercially available product, a combination of commercially available products, a modified version thereof, or any other application that is configured to perform the animation process described herein. By way of example, some commercially available products that may be used as animation applications in connection with various embodiments of the present invention include, but are in no way limited to, Mirage™ software (available from Bauhaus Software, Inc.; San Antonio, Tex.) Maya® animation software (available from Alias Systems Corp.; Toronto, Canada), Harmony™ and Opus™ 2D animation software packages, KToon™ 2D animation toolkit, and Flash MX™ 2004 and Animo™ software package (available from Cambridge Animation Systems; Cambridge, England).

One of skill in the art will readily recognize other products and applications that may be used to achieve the functionality of the cartoonizing application 1101B and animation application 1102B of the present invention. Such products and applications are considered to be within the scope thereof.

In one embodiment, the input 1103B to the cartoonizing application 1101B includes a photograph or other 2D depiction of a subject. The cartoonizing application 1101B may be configured to accept any number of electronic file formats for the photograph or other 2D depiction of the subject (e.g., .jpg, .png, .gif, .bmp, .pdf, etc.).

In another embodiment of the present invention, the cartoonizing application 1101B provides an array of graphics editing options to a system user, enabling the user to modify the 2D depiction of the subject. Any number of graphics editing options can be incorporated in the cartoonizing application 1101B, as will be readily appreciated by those of skill in the art. The cartoonizing application 1101B may include a user selection operation whereby a system user selects a portion of the photograph or other 2D depiction of a subject to be cartoonized (e.g., if the subject is a person and the photograph depicts a full body image of the person, a portion selected for cartoonizing may be the person's face). Additionally, the user may have the option of adjusting the size of the 2D depiction of the subject or portion thereof (e.g., smaller, thinner, wider, etc.), as well as the options of adjusting skin tones, selecting eye color, and the like. A practically unlimited number of such graphics editing options may be included in the cartoonizing application 1101B in connection with alternate embodiments of the invention. The graphics editing options may be implemented by a system user by selecting values with radio buttons, selection dialogs, and the like.

Moreover, the cartoonizing application 1101B may be configured such that a system user implements a graphics editing operation (e.g., a change in eye color), and the results of that editing operation are displayed as a preview via output 1104B. The output 1104B of the cartoonizing application 1101B is a cartoonized version of the photograph or other 2D depiction of the subject or portion thereof. The output 1104B of the cartoonizing application 1101B may be in electronic communication with the animation application 1102B. In an alternate embodiment of the present invention, the output 1104B may additionally or alternatively include a print feature that enables a system user to create a printed version 1114D of the cartoonized version of the photograph or other 2D depiction of the subject or portion thereof. Any printing device in electronic communication with the cartoonizing application 1101B may be used in connection with this aspect of the invention, as will be readily appreciated by those of skill in the art. In a still further alternate embodiment of the present invention, the output 1104B may additionally or alternatively include a view feature 1114C that enables a system user to view the cartoonized version of the photograph or other 2D depiction of the subject or portion thereof. Any viewing device may be used in connection with this aspect of the invention, as will be readily appreciated by those of skill in the art; for instance, a computer monitor or other display apparatus in electronic communication with the cartoonizing application 1101B.

The animation application 1102B may include a database of predefined animated stories 1107B. In operation, the animation application 1102B incorporates the cartoonized version of the subject or portion thereof from the photograph or other 2D depiction into predetermined locations in the one or more predefined animated stories from the database 1107B to create an animated video with cartoonized elements. Although this can be readily accomplished in a number of ways, in one embodiment of the present invention, each predefined animated story includes a template with positions marked throughout for character faces or other components of the animation. Specifically, a predefined animated story may be comprised of a series of frames (1-n) each with a standard set of Cartesian coordinates. Thus, a template may indicate that, at a particular frame, and a specified set of coordinates and geometric shape values (radius, diameters, etc.), the cartoonized version of the image is positioned. The template may provide for a wide array of additional features to further modify or select a particular cartoonized version, such as an indication of a particular facial position type (e.g., viewed from the left or right side), a palette for skin tone values, and many others.

By way of non-limiting example, in one embodiment of the present invention, the predefined animated stories are a series of different children's tales including the same or different characters (e.g., superheroes, animals, fairy tale characters, etc.), and the cartoonized version of the subject or portion thereof is the face of a person from a photograph. In this embodiment, the person's cartoonized face becomes the face of one or more of the characters in the story. Rather than being used in a single frame, the cartoonized face is used throughout (that is, from the beginning to the end) the story for that character (or characters), with various viewpoints, expressions, and the like, as is necessitated by the particular story and the animation scheme that illustrates it.

In an alternate embodiment, multiple faces can be input to the system 1100B such that, for example, the face of each member of a family in a photograph may be cartoonized and thereafter become the face of a different character in a story. In a still further alternate embodiment, additional aspects of the subject may be included from the photograph or other 2D depiction, such as the user's body, such that the characters in the stories take on these features of the subject as well (e.g., body type, height, hairdo, etc.).

The input 1105B may further include a series of user selection operations whereby a system user selects a particular predefined animated story from the database 1107B. In alternate embodiments of the present invention, the series of user selection operations may also include a user selection of other character parameters for the story that relate to the predefined animation and not to the manipulation of the 2D image (e.g., the character parameters may include height, weight, name, etc. of each character). The input 1105B may also allow the user to select the format of output 1106B that is desired (e.g., selection of storage media for the finished product, selection of print parameters and format for printing some or all of the animated video).

The animated video with cartoonized elements may be output from the system 1100B through the animation application output 1106B. The system 1100B may be configured to store the animated video with cartoonized elements directly onto a digital versatile disc (DVD) or hard disk drive (HDD) or another conventional electronic storage medium. The system 1100B may also be configured to output the animated video through an electronic communications channel, such as via upload to the Internet or as an attachment to an electronic mail message. The output 1106B may alternatively or additionally be configured for any number of output formats (e.g., pal/ntsc, 35 mm, Flash, etc.). In an alternate embodiment of the present invention, the output 1106 may additionally or alternatively include a print feature that enables a system user to create a printed version 1116B of some or all of the animated video with cartoonized elements. Any printing device in electronic communication with the animation application 1102B may be used in connection with this aspect of the invention, as will be readily appreciated by those of skill in the art. A system user may, for instance, print some or all of the frames of a particular animated video. In one embodiment, the output 1106B may be formatted for printing some or all of the frames of a particular animated video in a comic book type format.

System Architecture

Figure 12:
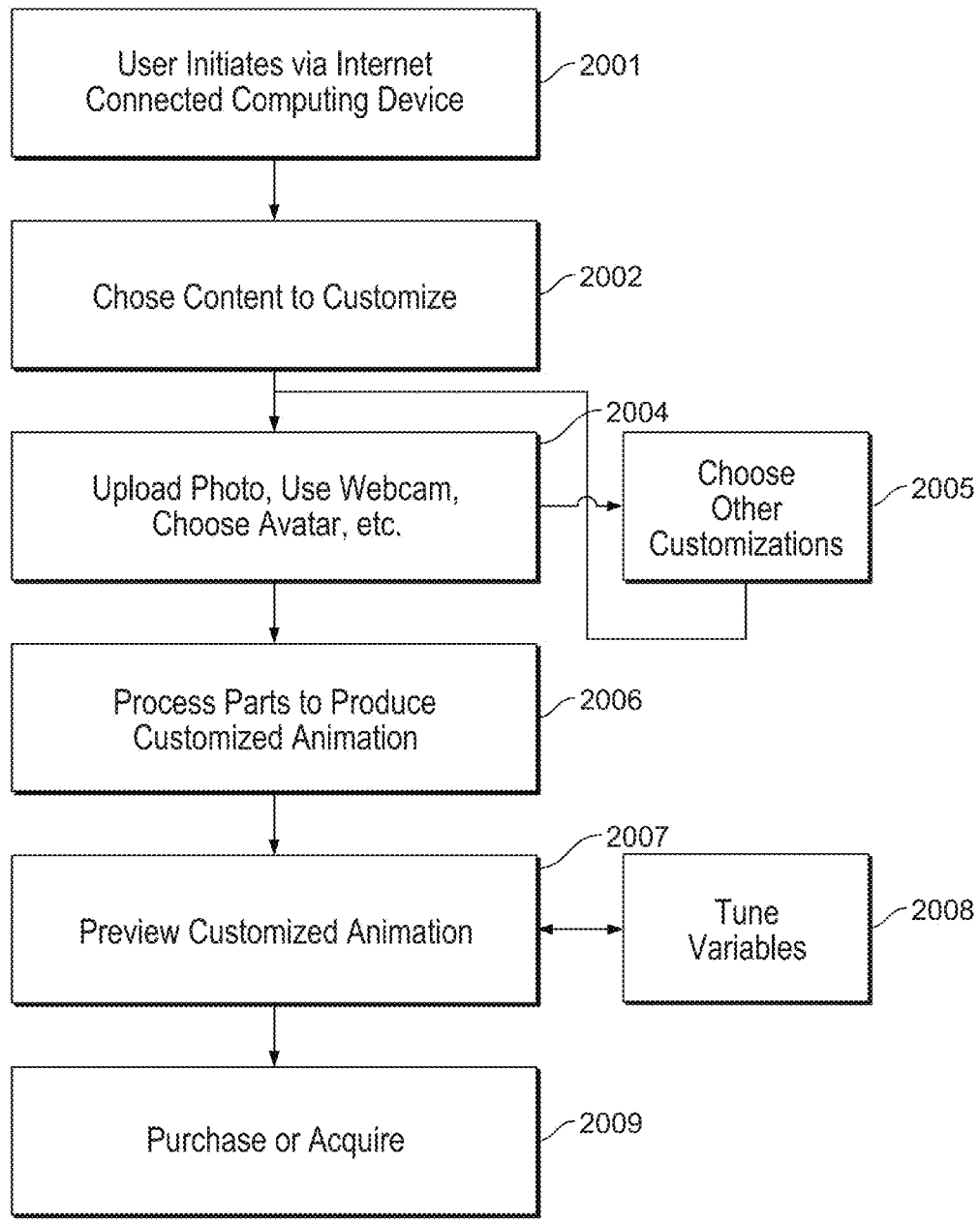
FIG. 12 is a flowchart illustrating a user process for generating a customized animation video according to one embodiment of the present invention.

According to another aspect of the present invention, the customized animation video system is initiated by a user using an Internet-connected computing device. FIG. 12 is a flowchart illustrating a user process for generating a customized animation video according to one embodiment of the present invention. Referring to FIG. 12, a user initiates the customized animation video process using an Internet-connected computing device (step 2001). Examples of Internet-connected computing devices include, but are not limited to:

Smartphones, such as the BlackBerry, iPhone, Palm Pre or HTC Touch;

Handheld connected devices without phone capabilities such as iPod Touch, PlayStation Portable, or Nintendo DS;

Internet connected game consoles like the Wii, Playstation 3, or Xbox 360; and

Internet connected personal computers (PCs) such as Macintosh or Windows OS based PC.

Internet access is generally directly through broadband Internet connection or via the public switched telephone network (PSTN) switch to the Internet. The Internet-connected computing device presents to the user an access interface, typically a graphical user interface (GUI), that is consistent with the hardware, firmware and software of the device. The application that presents the GUI on the device may be loaded in a number of ways. It may be locally loaded, such as an iPod Touch software module for example, loaded using a CD-ROM or DVD or other disk or memory stick, thumb drive, cartridge or dongle. Or, it may reside on the Internet and be presented by way of a Browser and Web Services. Or it may be in hardware and connected to the Internet by way of an Internet Connection Manager within the device, such as in the Wii device for example.

The user selects content to customize (step 2002). An avatar is generated representing a person or other animate object, under the direction of the user (step 2004). In order to generate the avatar, the user may use data from a computer file external to the system, a file or database explicitly tied to the system, a photograph, video, or live video feed converted to a standard graphic file format through external process or via one embedded in the application or through a Web service. The image does not have to be photograph quality, but may be made available as a 3D skeleton, framework, model, or in another file format that communicates the physical assets of the person. This process will repeat for as many avatars or animated objects as is required. Additional objects may be added to the selection for processing, either manually, automatically or both manually and automatically (step 2005). These objects may or may not be customizable by the user. An automatic addition may be made due to the selection of the animation, for example the choice of a detective animation could require the personalized character image to hold a meerschaum pipe or a vampire theme could require fangs and a cape. In these respective examples, the user may be allowed to change the type or color or pipe, or the length of fangs, as examples of customizable attributes.

The personalization process combines these selected pieces, the user-modifiable parameters, and animation-specific parameters or features to generate a preview of the customized animation (step 2006). The user can now preview part or all of the customized animation (step 2007) and optionally fine-tune the customized animation (step 2008) by tweaking the variables that made up the components for the process using various types of tool interfaces, like on-screen buttons, sliders and dials for example. The user may purchase or acquire the resultant product (step 2009), the purchase or acquisition process takes the output and delivers it to the user in the desired format and on the desired platform. The platform may be a physical form such as a DVD, or a file for viewing on a device such as an iPhone, TV or PC for example. The personalized animation may be as small and simple as an animated avatar that can be used to represent the user in a social networking application for example, such as Facebook.com or Myspace.com, or a full length movie with animated, customized objects.

Figure 13:
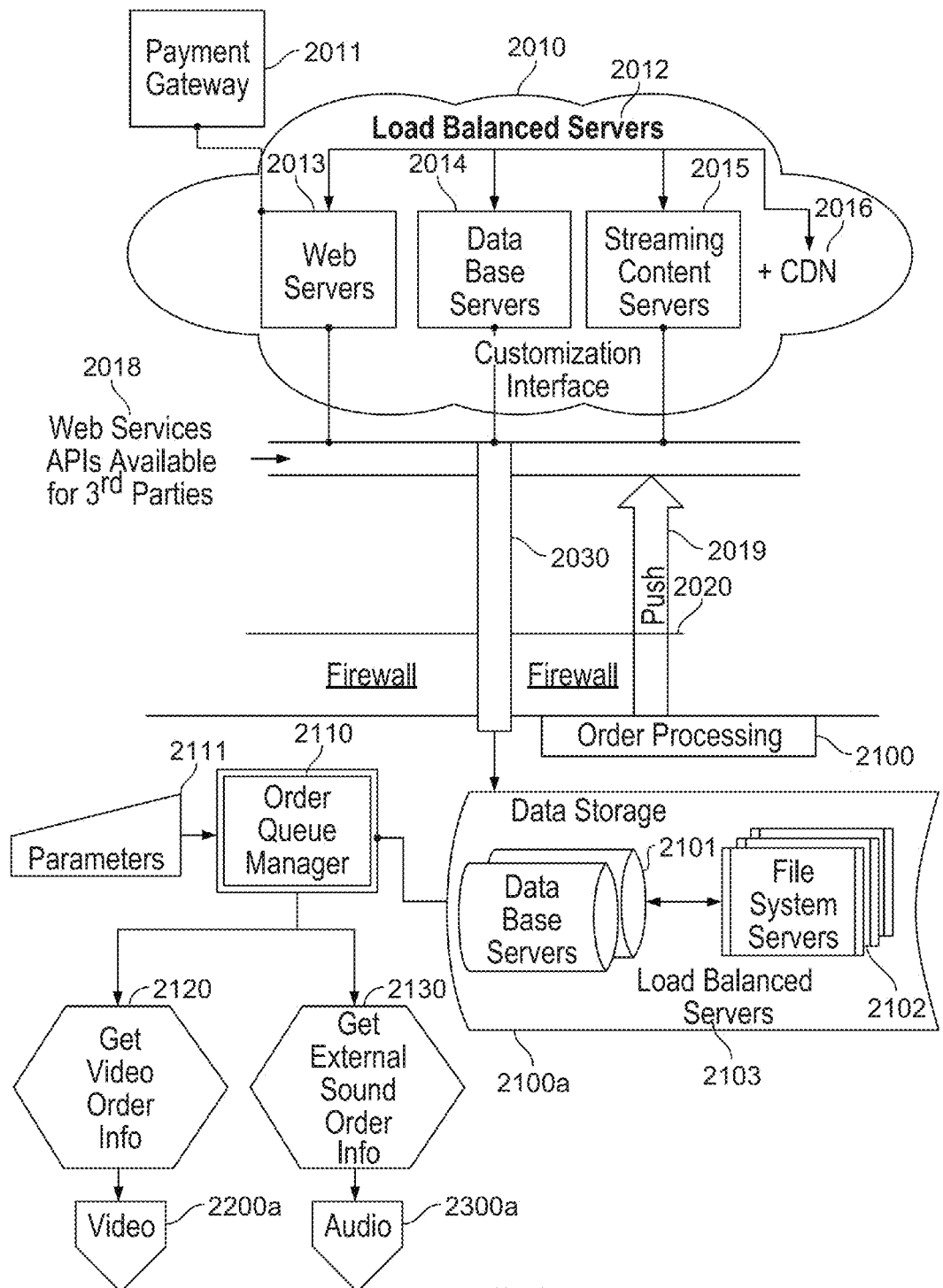
FIG. 13 is a functional diagram of a customized animation video system configured for multiple user access according to one embodiment of the present invention.
Figure 14:
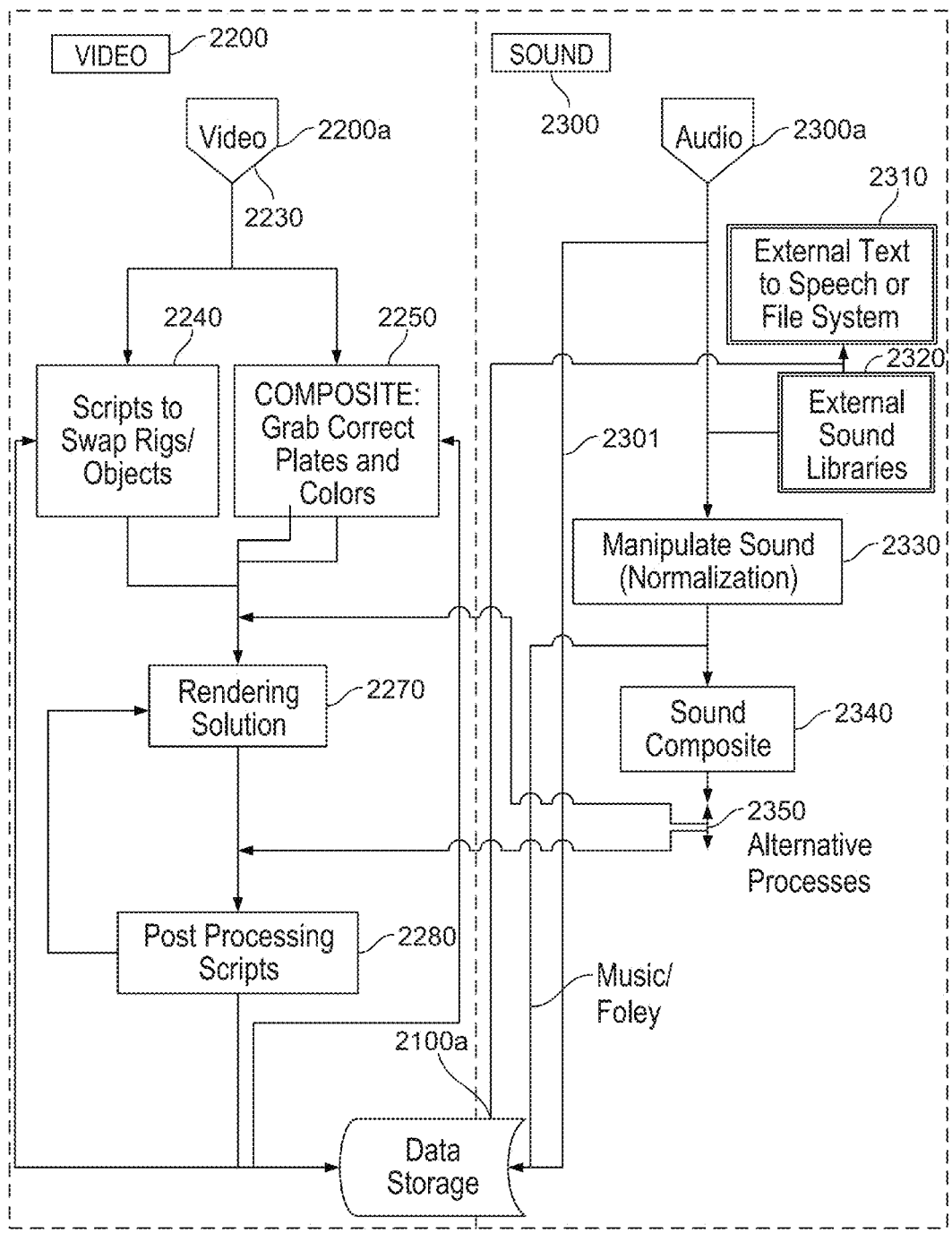
FIG. 14 is a functional diagram of an order processing subsystem according to one embodiment of the present invention.
Figure 15:
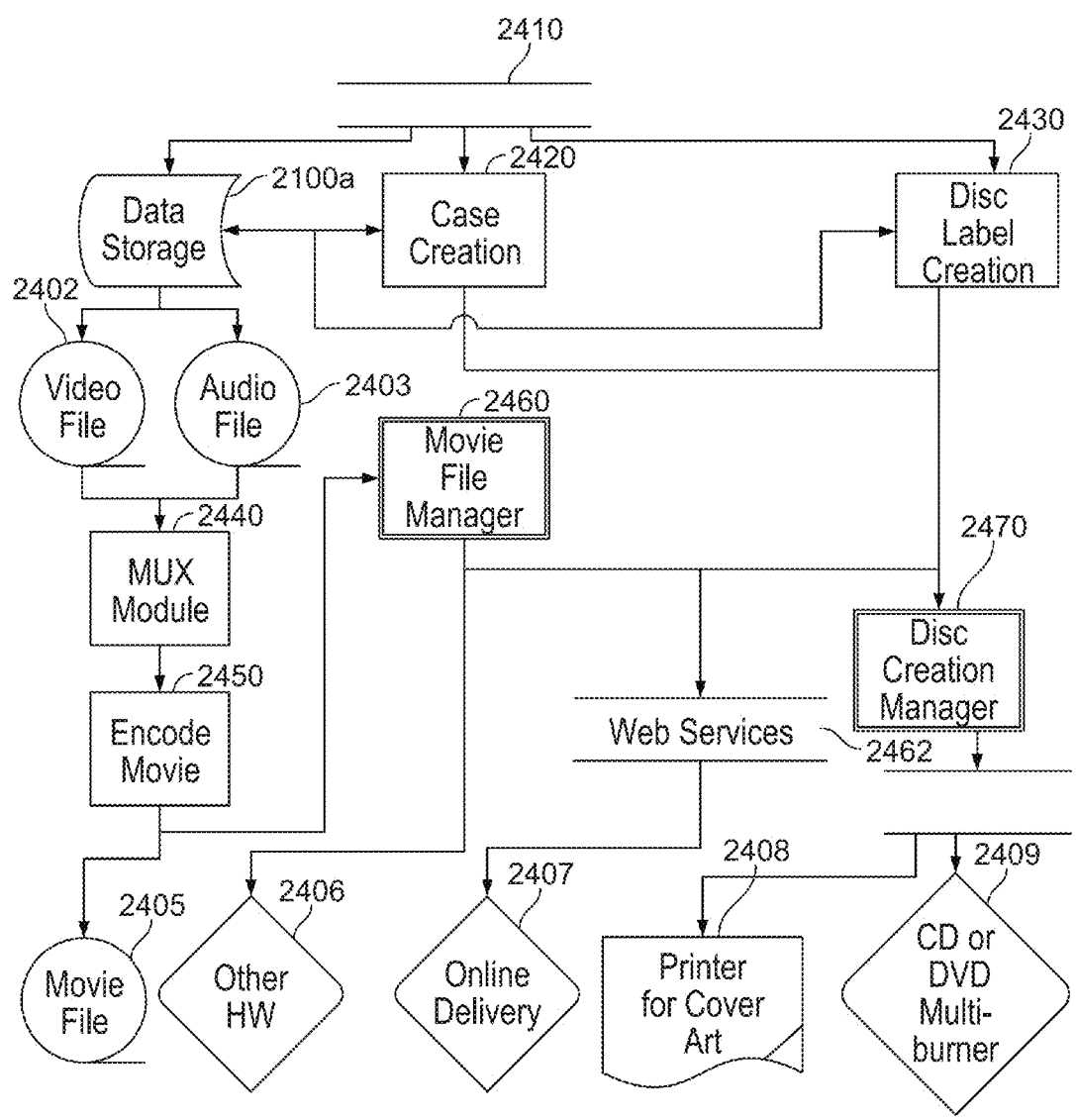
FIG. 15 is a functional diagram of a fulfillment processing subsystem according to one embodiment of the present invention.

FIGS. 13-15 illustrate the overall architecture of a customized animation video system and its subsystems according to one embodiment of the present invention.

FIG. 13 is a functional diagram of a customized animation video system configured for multiple user access according to one embodiment of the present invention. Referring to FIG. 13, multiple users may enter the front end of the system 2010 in any order or relative time of entry over any given period. A user enters the front of the system 2010 through an interface, for example, a GUI on a computer, cell phone, or game console. The interface allows a user to access the Web Servers 2013. This interface may require a password or payment or other criteria prior to allowing access. Web Servers 2013 can be used to serve up web content. Data Base Servers 2014 can be used to manage tables and other multi-dimensional records. Streaming Content Servers 2015 can be used to serve up streaming content, often multi-media content. Load balancing hardware and/or software 2012 may be used to assist with optimal scalability of the system. The servers in the front end of the system may interface with a Content Distribution Network (CDN) 2016 to distribute content generated by the system. A Payment Gateway 2011 may be accessed by the system to enable commercial transactions such as credit card payments. The front end of the system may interface with Automatic Program Interfaces (APIs) of other systems 2018. For example, in generating a customized audio track, text input by the user at the front end of the process might be used with a text-to-speech service API to generate an audio file matching the text, which can then be sent back to the system 2010, stored, and used to generate the customized audio track.

The data entered at the front end of the system can be transferred to a Data Storage system 2100a, typically through a firewall 2020. Similarly, the final content generated by the system after order processing can be pushed back (2019) to the front end of the system for distribution and/or display, typically through the firewall 2020. The Data Storage System 2100a typically includes Data Base Servers 2101 and File System Servers 2102. Load balancing hardware and/or software 2103 may be used to optimize the scalability of the system data storage.

Based on parameters 2111, which may be modified in real time, and the status of the various processes in the Order Processing Subsystem (FIG. 14), the Order Queue Manager 2110 releases the orders for processing in accordance to the priority given each order through the algorithmic process of the Order Queue Manager. The Order Queue Manager is highly flexible due to the algorithmic approach and status feedback by the other processes in the Order Processing Subsystem. The rules are applied to all orders in the queue for the given period, and if there is no specification of a change in period length for the next period, it repeats the processing for the next batch in the order queue.

For each order, the Order Queue Manager initiates two or more parallel order processes. These order processes are often of two multimedia types, video and audio, though additional file or media types may be included; for example, text messages like "Happy Birthday", "God Bless You" or "Shalom". The order initiates processes to get the external files that it needs, such as external video order information 2120 and external audio order files 2130. Each order process has as part of its data business rules for managing the rest of the order processes and control instructions for returning results. Once the data required to fill the order has been gathered and any prioritizing rules have been attached, the order processing continues to steps 2200a and 2300a respectively of FIG. 14.

FIG. 14 is a functional diagram of an order processing subsystem according to one embodiment of the present invention. FIG. 14 demonstrates how the order processes can be tied together to produce (i) a digital preview of the order for the user, which is returned to the user to view and tweak through the customized interface used to place the order, and/or (ii) a file that is sent on to the fulfillment pipeline shown in FIG. 15 which is a functional diagram of a fulfillment processing subsystem according to one embodiment of the present invention. The collection of processes that manages the creation of still and video images is demonstrated by the group of Video processes 2200. When referring to "video" in the present description, still images as single-frame videos are also included in the definition of "video." The video order information collected at step 2120 (FIG. 13) can be input into scripts 2240 that select specific objects, for example animated rigs or models, from Data Storage 2100a (FIG. 13). The same video order information collected in step 2120 (FIG. 13) can also be used to select objects for compositing into the video 2250, including for example plates, colors, or other files selected from Data Storage 2100a (FIG. 13). The video order information can be used in a number of other scripts to drive the video properties. Selection of objects or file properties for insertion into the video for rendering or compositing is shown here as various embodiments of the present invention. As another embodiment, there may be images, pictures, video, or other files provided by the user as digital input or links to external files, as well as internal digital image, video, or animation files or links that may be specific to the interface or the user. As yet another embodiment, user-provided text may also be inserted into the video via compositing 2250. In this embodiment, a specific interface to the system might capture the spelling of a person's name to be placed on flags waved by a crowd in the video. Alternatively, an interface may collect multiple text segments. The text segments may be embedded in the image, video, or animation at different places within the content; such as a name for the stadium "Bush Gardens", the name of a contestant splashed in several places on the scene, or a catch phrase slogan that may be reproduced onto the side of a race car.

The objects or file properties that are inserted and rendered or composited in the video may also depend on parameters not input by the user. For example, the scripts that modify the video content may pull data from the system such as the time of day on a computer clock or the location of a cell phone, which could impact the selections of objects or properties pulled from data storage 2100a in steps 2240, 2250, or other video modification steps not shown in this embodiment but discussed above.

In one embodiment, in the case of an interface designed to support the creation of a class yearbook, there may be an administration interface which allows for input of the school crest, pictures of the school property, and pictures of school teachers and clubs. Another interface to the same project may allow the journalism department to link still images and video of important events which occurred during the school year, such as Home Coming, sports, and dances. A third interface lets the individual select pictures to use and/or a personal testament. This data may all be used to produce personalized DVDs for each student for example. The personalization may include letters, pictures or video provided by teachers for specific students. This personal content can be inserted onto the student's specific Class DVD, possibly in addition to other content that is common to a group of DVDs. This last embodiment demonstrates how an implementation that provides only one output, in this case the personalized Class DVD, may have multiple user interfaces to provide select populations the means to provide data that can be processed both individually and globally for shared and personalized content.

In another embodiment, a user interface can be designed to let a user make a cartoon character of himself or herself or another animated object that will be inserted into the action of an animated cartoon. There are many methods to select the particular feature modification for the "drawn" character or avatar. Where the present invention is unique and highly differentiated from the state of the art is that the user may be presented other criteria that can be directly imported into the animated cartoon. In this embodiment, the user makes the avatar as they desire. It matches the art style of the animated cartoon due to the restrictions provided by the system. The creation of this still two or three dimensional avatar may use the system's video modification and composite processes to generate it with a feedback loop where the image is delivered to the online 2407 interface via the fulfillment processing subsystem FIG. 15. The avatar creation may be performed at the interface and the device that uses the interface, or it may be dependent on interaction with the system, or a combination of both. However, once the avatar is created, it can be emotionally personalized. Within the animated cartoon is another character who will be replaced by the personalized avatar. This cartoon character has a pool of available expressions and movements that now become available to the user through the interface so as to personalize the avatar's reaction to various emotional situations within the context of the animated cartoon's story. The user may have the choice to tweak the reaction through the interface; such as having the right corner of the mouth rise higher during a smirk or smile. When the user is ready to select to preview or place an order, the system data storage 2100a has all the information it needs for the use of the video modification process 2240 that swaps rigs and objects to shape and animate the avatar, and the composite process 2250 that will colorize the avatar. The outputs of these two processes feed the rendering solution 2270 (FIG. 14) for the rendering process. The rendering process may be done in many different ways as the state of the art is continuously progressing. The output of the rendering solution is passed to the optional post processing scripts process 2280 (FIG. 14), that may modify the image to show movement or other effects. This may then be passed back into the rendering solution 2270 for clean up. It is possible for this loop to have multiple iterations. The output of the video process is stored in the system data storage 2100a.

Continuing this example for the sound component of the multimedia system, the order queue manager 2110 (FIG. 13) also initiates the processing of the sound for the system. There are many ways for the user to input a name, for example, if the output of the system requires it. As per this example, consider one of the characters in the animated cartoon speaking the name in context and with the right timing and inflexion. This is another distinctive and unique capability of this invention.

If the interface allows audio input then the user will speak the name for audio capture, such as into a microphone, and also type the correct spelling of the name. The interface collects the name pronunciation data along with the text that the output requires, and stores the data in the system data storage 2100a along with the rest of the order data. When the order queue manager 2110 releases the order for processing, the process "Get External Sound Order Info" 2130 takes the captured sound and analyzes it for phonemes and accent shifts, data that is then stored with the name. This sounding data is used by sound subsystem 2300 (FIG. 14) to generate the proper pronunciation of the name in the voice of another character. Alternatively, the name as voiced by the user can go directly into the process to manipulate sound 2330 which can change the user's sound into the voice of the other character.

Without audio input, the interface may provide audio feedback, if this is available on the user's device. If so, then the interface can use one of many ways to produce the proper pronunciation through text interaction with the user. The interface can use various forms of linguistic inscription forms from the highly descriptive International Phonetic Alphabet to the simple use of the English language alphabet to describe the shape of the sound. Consider the name "Stephen" and is pronounced by the user as if it were spelled "Steven". The user would enter "Steven" for the pronunciation and "Stephen" for the spelling, and the internal database of would match the sound clip with the name as pronounced by the voice over artist of the animated cartoon character. If the name does not match a database entry, an external test to speech system or engine 2310 (FIG. 14) may be applied. There are many variations on "Text to Speech" engines available commercially.

As the sound system continues to process the sound requirement for the interface, the system may acquire additional sound resources as needed from external sound libraries 2320. For example, if an animated bird is part of the animated cartoon and the sound is meant to be localized to the user's geography, then a sound library of bird calls could provide the sound effect to match the animated bird that comes into the video composite from another source. The process to manipulate the sound or normalize it can provide the spoken name to fit the available timing at the point when it is used within the animated cartoon. The output of external sound libraries 2320 provides the sound composite process 2340, along with music and folly files from the system data storage 2100a, the data it needs to create the sound track for the animated cartoon. This is then stored in the system data storage 2100a.

Once the content has been generated and stored in Data Storage 2100a, the Order Queue Manager 2110 (FIG. 13) dictates where the content is sent. For example, if the content is intended to be previewed by the user, it may be pushed (step 2019) to the front end of the system 2010 for viewing at the user interface. In the example of a personalized animation, an animation segment might be pushed to a cell phone, computer, or game console for example for previewing by the user prior to making a purchase or as part of a marketing campaign. Alternatively, the content might be sent through an order fulfillment process such as that shown in FIG. 15.

In FIG. 15, one or more parallel processes are initiated (step 2410) as required to fulfill and order based upon instructions from the Order Queue manager 2110. From Data Storage 2100a, the video file 2402 and audio file 2403 are multiplexed at a multiplex module (step 2440) and then encoded (step 2450) to generate a movie file 2405. The movie file may be encoded in MPEG2. In parallel, other processes may be ongoing. For example, if a DVD is being created, instructions may be sent to create a case 2420 including, for example, art work. Similarly, instructions may be sent to create a label for the DVD 2430. Once the movie file 2405 is created, a movie file manager 2460 determines where to send the encoded movie. This may be to a DVD through a disc creation manager 2470 for example, subsequently triggering printed cover art for the case 2408 and burning of the physical DVD 2409. Similarly, the movie file may be sent to other hardware 2406, such as Data Storage 2100a for example. Similarly, the movie file may be delivered directly online 2407, optionally through web services 2462 that may be part of the system of this invention or a remote system.

Customization of Videos at Viewer Location

According to another aspect of the present invention, a viewer location video customization system and method implements customization of a video stream at the viewer location. In this manner, each viewer receiving a video stream, which may be a broadcast stream, may customize the video stream according to the viewer's preference at the viewer's location so that each viewer may enjoy a personalized version of the video. Prior to the present invention, broadcast transmission may be customized only for a greater geographical area so that viewers in the entire greater geographic area receive the same broadcast signal. However, the viewer location video customization system and method of the present invention enable a viewer to customize the incoming broadcast data stream to the viewer's preference so that individual viewers in a greater geographical region may view a different video from the same video signal, such as a broadcast signal.

In the present description, a video stream refers to a data stream containing both video and audio data. The video stream may be a live action video, an animated video, a broadcast signal or an on-demand video signal.

Figure 16:
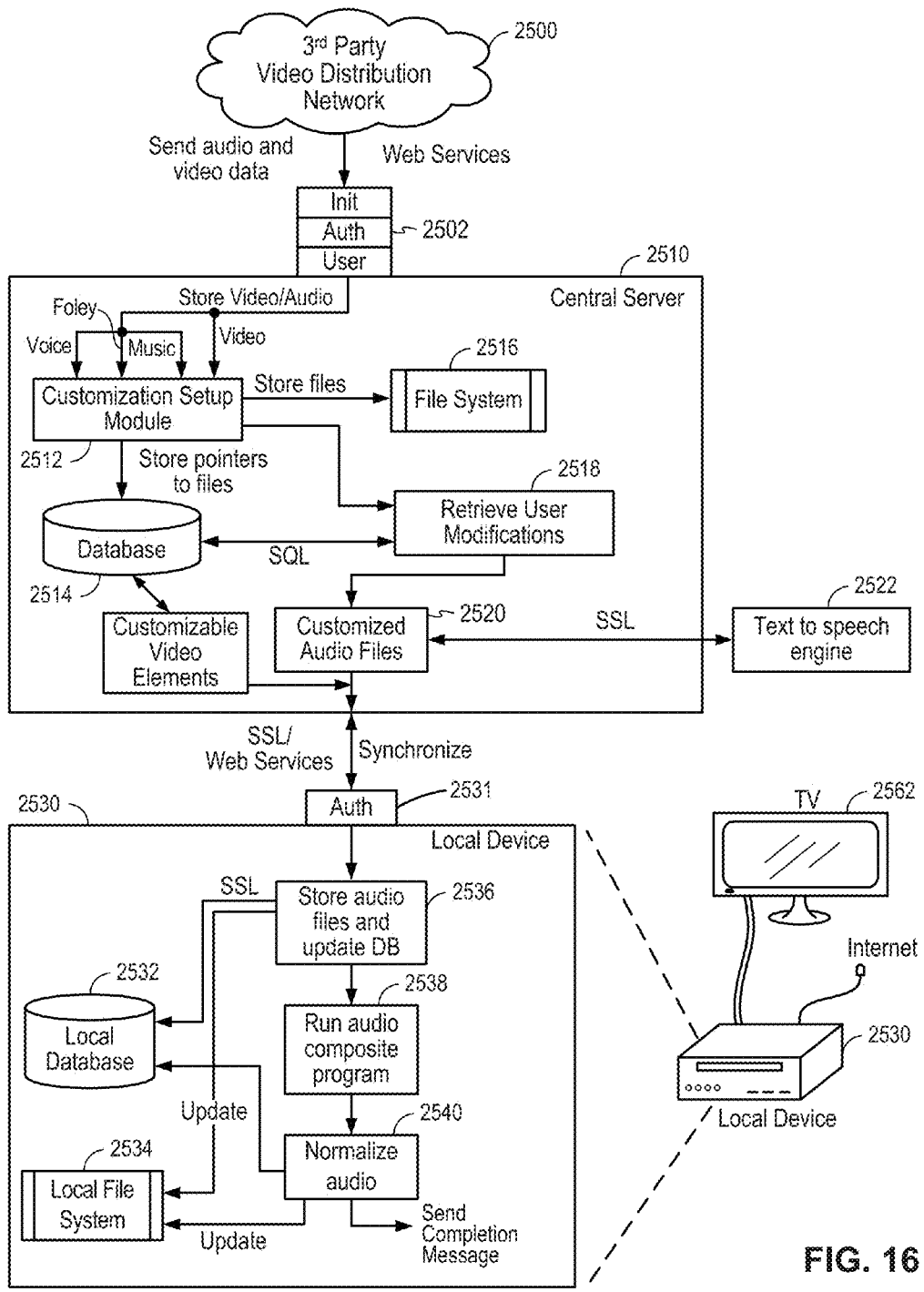
FIG. 16 illustrates the set-up process for enabling viewer location video customization according to one embodiment of the present invention.

According to one embodiment of the present invention, a viewer location video customization system and method involve a set-up process where preparation of audio files and video files for customization is performed and a local customization process where the customized video content is generated and displayed. FIG. 16 illustrates the set-up process for enabling viewer location video customization according to one embodiment of the present invention.

Referring to FIG. 16, a third party video distribution network 2500, such as a broadcast station, provides video content, such as movies or television programs to a central server 2510. A copy of the combined video and audio stream of certain video content is transmitted from the network 2500 to the central server 2510 using web services 2502, for example. In other embodiments, an equivalent Remote Procedure Call or other equivalent web operations may be used. In some embodiments, there is limited, protected access to both the video distribution network 2500 and the central server 2510 such that a secure method of authentication or identification is used by the web services. For instance, the audio content customization system may be a fee based service, or a subscription service not generally available to the public at large.

At the central server 2510, the video and audio data files are stored in a database 2514. More specifically, the video files are processed by a customization setup module 2512 to identify the customizable video elements which are stored in a file system 2516 with pointers stored in the database 2514. For the audio files, each of the layers of the audio files (voice, music, foley) is separated into voice, music, foley and other potentially customized asset/audio types. In the present description, an animation asset refers to any animated objects, images, motions, sound files, or any other item that is used in generating an animation. The audio files are processed by the customization setup module 2512. The audio tracks are cataloged in the database 2512 for the video content by type, thereby building a master list of assets for the final customized video product. Each sound clip or track is stored as a file in a local file system 2516, while a master catalog of the sound clips for the entire animated video is stored in a database 2514 along with pointers to each file comprising the audio portion of the video content.

Attributes that may be stored in the database 2514 would include, but are not limited to, type, duration, and location of the files in file system 2516. For example, the first 5 seconds of the opening credits soundtrack would have a record in the database 2514 showing its location on the file system 2516 so that it could be added or replaced to a selected animated video. The customization setup module 2512 also builds a basic sequence of audio assets for each selected video content available to be customized, so that audio assets can be sequenced after customization is complete. The customization setup file can also be used to process updates to existing assets. The database 2514 tracks versions of audio files retrieved. The structure of the file system 2516 accommodates multiple versions of each of the audio files—modifications are tracked with a version number. For instance, when an animated video from the library in network 2500 is selected, the current version number is assigned. Audio files are grouped by their version number and can be served upon request. Retaining the version information allows an older version of an asset to be distributed later.

User or viewer modifications or customizations to any particular video content are tracked in the database 2514. In particular, the database 2514 stores the catalog of audio files associated with the selected videos. In some embodiments, the database 2514 may be formed as a single database or a family of databases. The database 2514 tracks dialog and phonetic variations, background noises and sequencing (i.e. foley), changes to soundtrack and other music changes. The database 2514 also stores the intended device used to display the finished video.

As part of the customization process, the user (or viewer) modifications stored in the database 2514 are aggregated and mapped to individual audio assets. User modifications 2518 are retrieved from a database. A master listing of all video assets used for the final animated video are built, encompassing standard or non-modified assets as well as those parts of the audio requiring further customization. For each video asset in the sequence of the stream, contiguous blocks of non-customized audio are sequenced while blocks of audio subject to the customization process by the customization processor 2520 are enumerated.

For each audio block, the desired audio customization is fed into a text-to-speech engine (also referred to as "text-to-speech converter") 2522. In some embodiments, the text-to-speech engine is a module separate from the central server and is accessed by making secure webservice calls to the engine. In one embodiment, transmission between the central server 2510 and the text-to-speech engine 2522 is provided over a secure protocol. Parameters passed to the text-to-speech engine 2522 include, but are not limited to, the word(s) to be spoken, the phonetic spelling or intonation of the words to be spoken, the desired voice used to speak the words, the pitch and cadence. Given these parameters, the text-to-speech engine supplies output in an audio format to the customization processor 2520. At the conclusion of the text-to-speech processing, custom audio files for a given video content for a given user are generated.

At predetermined times or periodically, the customization information for the video content stored in database 2514 of the central server 2510 is transmitted to a user's local device 2530 to be synchronized with a local database of the local device. In one embodiment, custom audio segments and also customizable video elements are gathered for transmission to the user's local device 2530. In one embodiment, the custom audio segments and the non-customized audio segments as well as the video tracks are composited at the central server 2510. In other embodiments, uncomposited audio and video files are transmitted to the local device 2530. The local device 2530 includes a module that authenticates the local device through web services 2531 before beginning the process of streaming the finished video or all of the uncomposited parts comprising the finished video.

The local device 2530 at the user or viewer location includes a local database 2532, a local file system 2534 and a receiver 2536 to receive the audio and video files from the central server 2510. The local device 2530 further includes a program module 2538 to composite the audio tracks and a program module 2540 to translate or normalize the audio tracks. In some cases, the local device may not be capable of supporting a database. In those cases, the central server 2510 performs the composition and transmits a composited final video to the local device.

In some embodiments, the local database 2532 may contain the following information: a master sequence of all assets (video and audio) required for final compilation of the animated video, a master catalog of all videos selected, the location of each asset on the local file system 2534, the status of the compilation sequence of the final video, including but not limited to files not yet received, audio normalized, composited, status updated, played or shared. The local database 2532 may also contain information allowing the device to identify itself with the central server 2510.

More specifically, the receiver 2536 on the local device 2530 listens for communication from the central server 2510. When the receiver 2536 receives a wake up message, the receiver needs to identify itself. Upon identification, the receiver 2536 receives an inventory of items transmitted and determines if it needs to create a new entry in the database 2532 for a newly fulfilled video or is receiving a video already composited. In some embodiments, the receiver 2536 communicates with the database in a secure manner.

The program module 2538 includes the audio compositing program. The compositing program takes as input each of the individual audio assets in sequence, including but not limited to the voice, foley and music layers of the audio. Note that this process may involve more than one iteration over the audio layers of the final video. Once complete, one audio file exists, and the appropriate status updates are made in the database 2532. Program module 2538 is omitted if the local device receives composited files directly from the central server.

The program module 2540 uses the output of the compositing process from program module 2538 to produce an audio track specific to the format required for display on a viewing device 2562, for example. In one embodiment, the program module 2540 normalizes the audio tracks and generates an audio tracks suitable for a television. After the audio normalization, the audio files are stored in the local file system 2534. A completion message may be generated and sent to the central server 2510.

In summary, in some embodiments, a system for customizing audio content in an animated video is configured to store audio data files and perform functions such as extracting voice tracks, extracting foley tracks, and extracting music tracks. The system may also perform functions to set up the animation video by storing files in the file system 2516 and update the database 2514 with pointer to the files.

Figure 17:
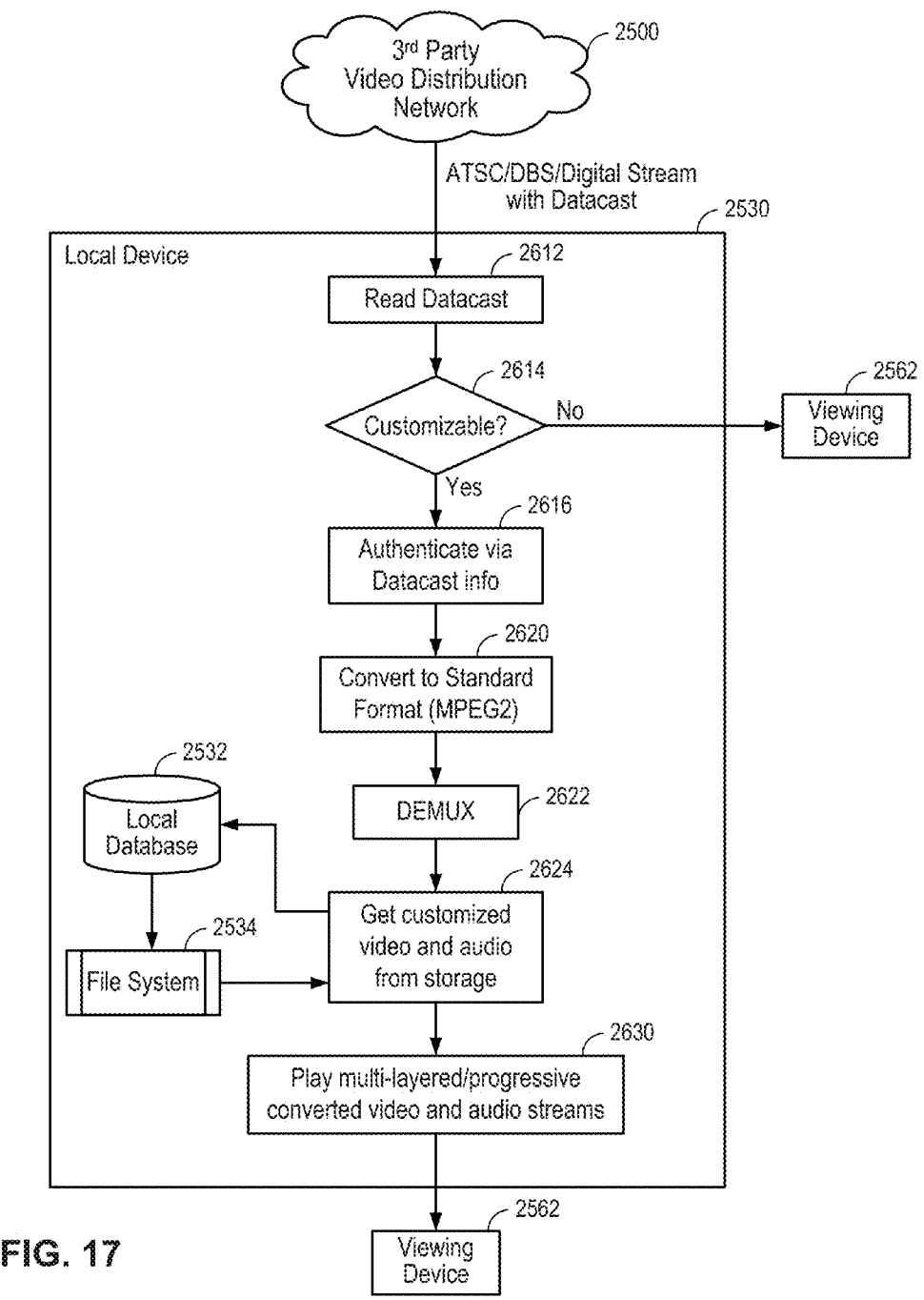
FIG. 17 illustrates a viewer location video customization system and method according to one embodiment of the present invention.

The local customization process at the viewer's local device will now be described with reference to FIG. 17. FIG. 17 illustrates a viewer location video customization system and method according to one embodiment of the present invention. Referring to FIG. 17, the third party video distribution network 2500, such as a broadcast station, provides video content, such as movies or television programs to the local device 2530. Distribution network 2500 is remote from the local device 2530 at the viewer's location and may communicate with the local device 2530 via wired or wireless communication links. Distribution network 2500 provides the desired video content that the viewer may wish to see. In some embodiments, the local device 2530 requests material directly from the distribution network. In one embodiment, the requested video data stream is delivered to the local device 2530 through an ATSC defined standard protocol. In other embodiments, other protocol can be used to deliver the requested video data stream to the local device.

According to embodiments of the present invention, the $3^{rd}$ party distribution network is a network station providing broadcast signals. The local device is configured to accept television (TV) or other input streams in a multitude of forms including, but not limited to, National Television Standards Control (NTSC), PAL, or the new ATSC broadcast, Digital Satellite Systems (DSS), Digital Broadcast Services (DBS), Moving Pictures Experts Group (MPEG), MPEG-2, MPEG-4, FLV, and others. As described below, the input streams are converted into a standard MPEG2 format or the current standard format for processing using any number of commercially available or open source products such as Ffmpeg or TMPGenc. The input streams are also demuxed into video and audio streams using any number of commercially available, open source, or proprietary products such as Ffmpeg, TMPGenc, or Adobe Audition The local customization process occurring in the local device 2530 is as follows. First, the local device 2530 reads the datacast stream coming in from the distribution network 2500 (step 2612). In the present description, a datacast stream refers to a video and audio stream that has accompanying data for identification and other purposes. An indicator in part of the datacast stream informs the local device 2530 if the datacast stream is customizable (step 2614). In one embodiment, a value in the header of the datacast stream indicates whether the datacast stream is customizable. If no customization is possible for the incoming stream, the stream is sent from the local device 2530 directly to the viewing device 2562, such as a television or a monitor.

For a customizable datacast stream, the data stream may have security information embedded as part of the stream, which includes the stream device identifier. The local device 2530 will authenticate the data stream to ensure that it is the intended recipient of the data stream (step 2616). Upon completing the authentication, the local device 2530 analyzes the format of the stream and converts the datacast stream to a given standard video format (step 2620). In one embodiment, the standard video format is MPEG2. In other embodiments, other video formats can also be used. Then, the audio layers are separated (voice, background/foley and music, as well as customized segments and non-customized segments) by a demultiplexing process (step 2622).

Local database 2532 contains at least the following information: a master sequence of all assets (video and audio) required for final compilation of the video stream, a master catalog of all products ordered, the location of each asset on a local file system 2534, and the status of the compilation sequence of the final unit. At step 2624, a process module in the local device 2530 retrieves the list of customized assets from the database 2532, and sequence the actual assets stored in the file system. In particular, customized audio files are retrieved and customized video elements are retrieved. In one embodiments of the present invention, the audio files are customized during the set-up process and stored in local file system 2534. Meanwhile, customizable video elements are also stored in the file system 2534 but customization of the video stream is performed on-the-fly, that is, as the video is being streamed to the viewing device. Accordingly, in the final step, the various layers of audio are recomposited. The recomposited audio, including customized content, and the video data, also including customized content, are streamed progressively to the viewing device 2562, such as a television (step 2630). In some embodiments, the output video/audio stream may be coupled to a decoder to convert the MPEG stream into output signals suitable for the viewing device, such as TV output signal.

In some embodiments, the video stream is customized by adding a character, such as a character or an avatar depicting the viewer. The viewer's character can be seamlessly integrated into the video stream using the customized animation video system and method described above. The video stream can also be customized by displaying certain viewer-selected elements according to the viewer's preference. For example, a viewer may specify that the preferred drink is orange juice and the video stream is customized so that the main character in the video stream drinks orange juice only.

In one embodiment, the viewer location video customization system is implemented in a local device which can be a set-up box for a television, a digital video recorder device or other devices for receiving incoming broadcast video signal and providing the signal to a display device, such as a television. In some embodiments, the local device includes a local database and a local file system which is configured to store audio and video data files. The local device is configured to update the local database, to perform audio composites and to normalize the audio tracks. The local device is further configured to communicate bi-directionally with a network device, such as the central server, using network communication protocols, such as SSL and web services.

In some embodiments, the local device is configured to synchronize files with the remote central server so as to update the local database with current user customization information. The local device is further configured to communicate with the third party distribution network to determine whether the video stream is customizable. If the video stream is not customizable, the video stream is sent directly to the display device, such as a television. If the video stream is customizable, the local device is configured to authenticate the user/viewer and may further be configured to convert the video and audio data to a pre-determined standard video format, such as MPEG2. The local device may be configured to demux ("demultiplex") the audio and video streams. The local device may be configured to retrieve customized video and audio files form its local database and local file system. In this manner, the local device provides a video stream with customized content to the display device.

Methods for Providing Custom Advertising in Animated Videos

According to another aspect of the present invention, a custom advertising system and method for customized animation video allows a user to select desired advertisements which are seamlessly integrated into the user-selected animated video which may include other user customization. The custom advertising system and method of the present invention provides the opportunity for a user to reduce the price he pays for a customized animation video by selecting certain advertisement placements.

Figure 18:
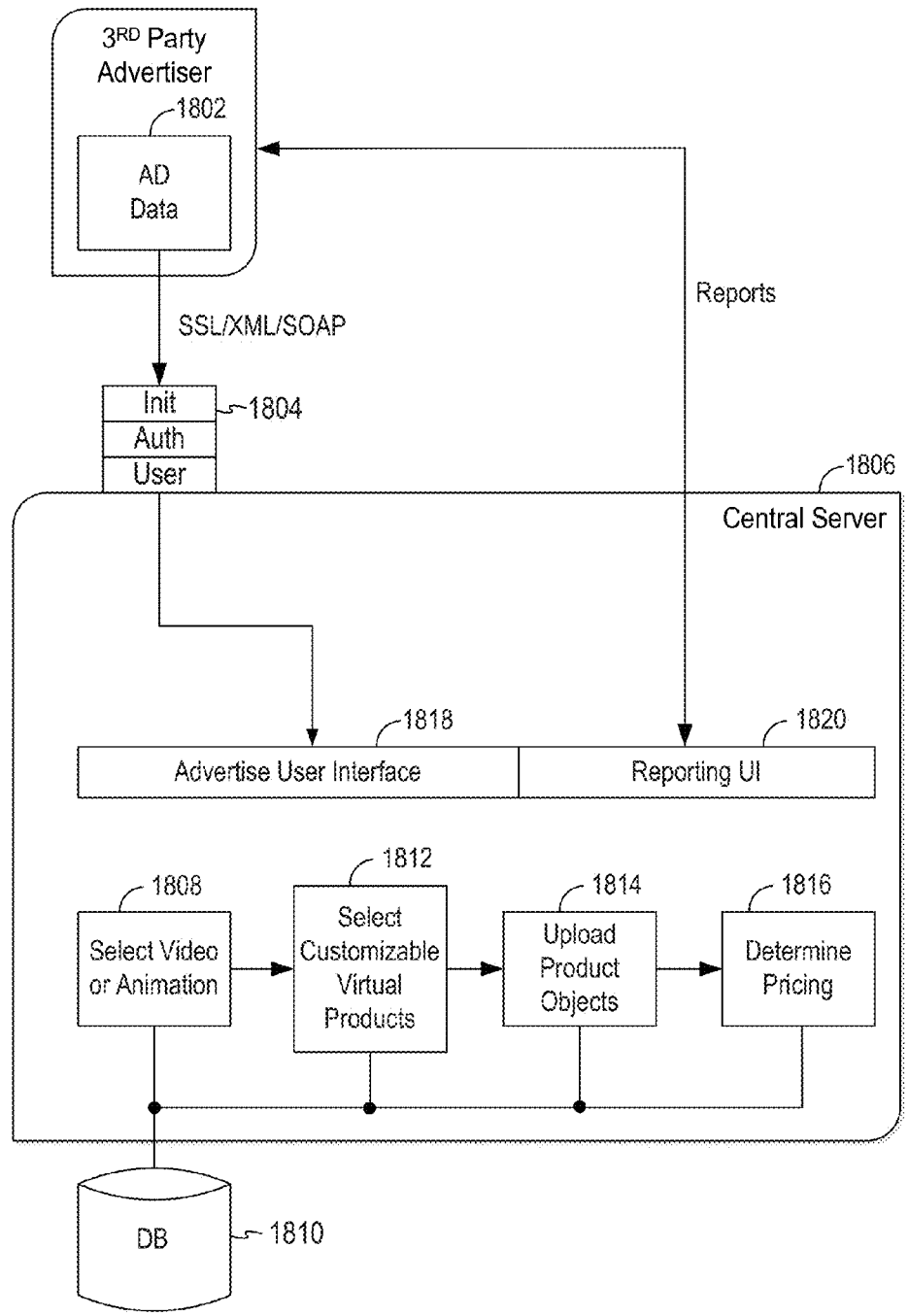
FIG. 18 illustrates a system for providing custom advertising in an animated video according to one embodiment of the present invention.

FIG. 18 illustrates a system for providing custom advertising in an animated video according to one embodiment of the present invention. Referring to FIG. 18, a third party advertiser maintains a database 1802 of advertisement data. The third party advertiser may connect to a central server 1806 configured to provide customized animation through a data network, such as the Internet. The third party advertiser may be connected to the central server 1806 using a data network protocol, such as SLL or SOAP/XML. The third party advertiser may be authenticated at an authenticate module 1804. Once the advertiser is authenticated, the central server 1806 provides to the third party advertiser an advertiser interface 1818 that enables the advertiser to take a number of actions including, but not limited to, choosing animations or videos (module 1808) from a database 1810 of videos and animations, choosing one or more customizable virtual products from the database 1810 (module 1812), uploading objects such as advertiser's products and logos (module 1814), and determining the pricing or discount packages for the advertiser-selected options (module 1816). In some embodiments, the advertiser may establish in module 1816 a discount package or a discount metric for the advertiser-selected options. Once the advertiser stored data in the database 1810, the advertiser may access the central server 1806 to add or modify the stored data. In some embodiments, the advertiser user interface can be provided on any kind of data displays, such as on a display of a mobile device.

For example, the advertiser may select a soda can as the customizable virtual product. The advertiser may then upload an image of his own specific soda can (e.g. Coca Cola or Pepsi) as the object for the selected customizable product. The advertiser-selected information is then stored in the database 1810 and may be retrieved later on from the same database when a user elects to create a customized animation video incorporating the advertiser's advertisement objects.

Through the pricing module 1816, the pricing scheme for placing the advertisement data in a customized animation video is determined. In some embodiments, a maximum price for each customizable product selected by the user may be used. A maximum price limit, such as the maximum price in a date range (day, week, month), the maximum price per video/order, the maximum price per individual objects may also be used. For example, certain fixed price may also be set, such as a price of 20 cent maximum for a Nike poster, and a price of 2 dollar maximum for a Nike shoe on the main character. In other embodiments, a maximum price per user may be set.

The central server 1806 further provides a reporting user interface 1820 to enable the advertiser to create, view and print reports of the product selections and financial data. The reporting user interface 1820 allows a user to select different attributes, e.g. brand type, product line (juices, soft drinks, etc) as the basis for a report. In some embodiments, the reports may include content such as financial data, animation selections, video selections, object selections, and object usage. Additional parameters collected by the reporting user interface may be added on to standard report queries to provide a customized view of the data as specified at run time.

Customized Animated Video with Opt-in Advertisement

Users or viewers of videos traditionally select videos to watch based upon recommendation from friends or reviews or based upon categories or genres. According to one aspect of the present invention, a system and method enable a user to choose a video based upon a predetermined set of criteria including price points and branding. More specifically, once the advertiser has stored its advertisement data onto the central server's database, a user or viewer can then select a video to watch which may include the custom advertising. The user or viewer may elect to include certain custom advertising in the selected video in exchange for reduced pricing. In the present description, user-selected custom advertising is referred to as opt-in advertising which may include opt-in product placement. Opt-in advertising refers to advertising in which the viewer can choose to accept or deny the advertising. Usually, but not always, the viewer is given an incentive to accept the advertising, through a discounted price for example.

In other embodiments, the user may elect to include user-selected customization to the video, apart from the advertiser customization. The user-selected customization may be generated using the customized animation video system and method described above. For instance, the user may elect to have a cartoonized version of himself incorporated in the selected video.

Figure 19:
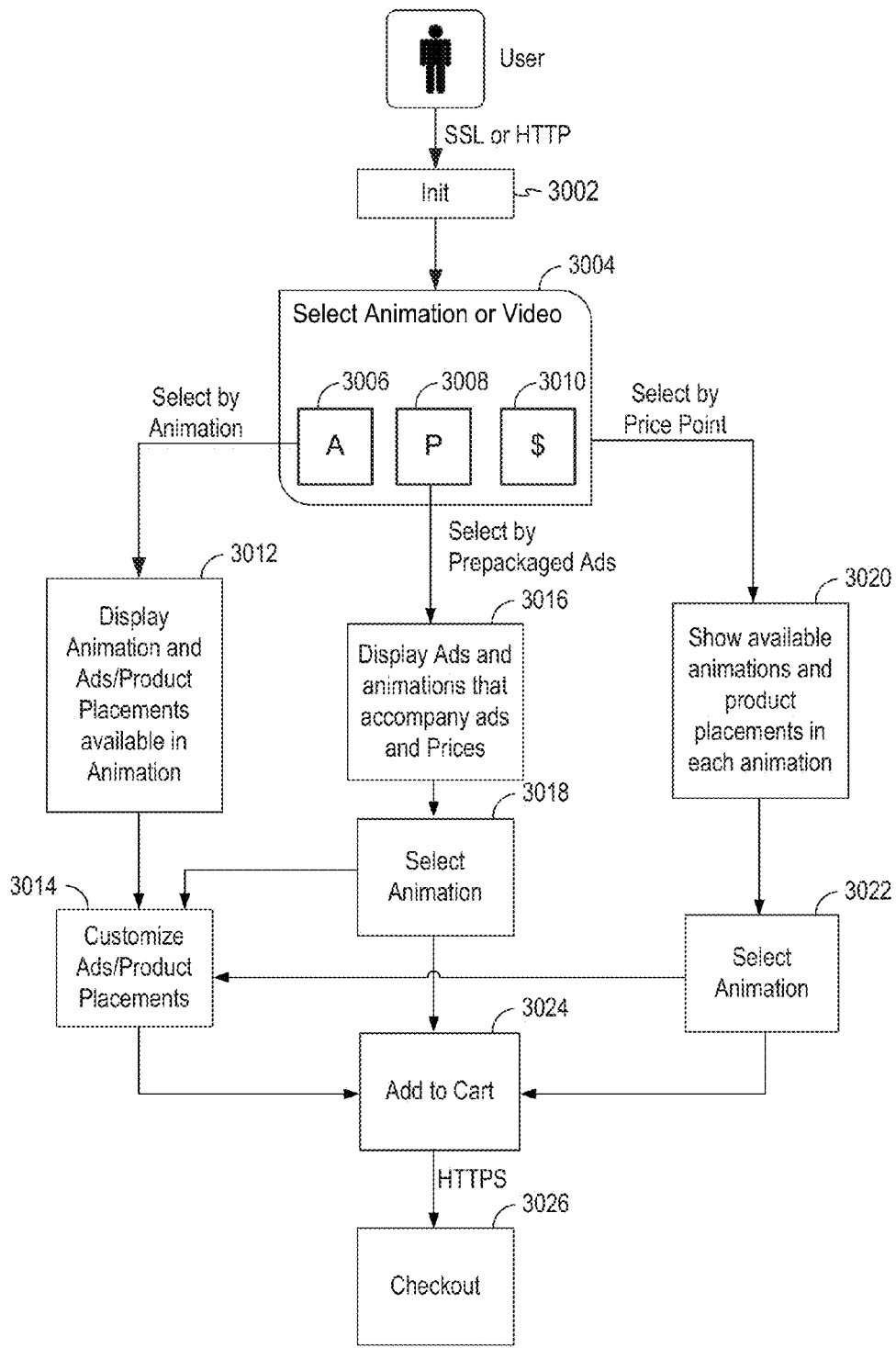
FIG. 19 illustrates a method for enabling a user to select a video based on price points and branding according to one embodiment of the present invention.

FIG. 19 illustrates a method for enabling a user to select a video based on price points and branding according to one embodiment of the present invention.

Referring to FIG. 19, a user connects to a central server for creating a customized video over a data network, such as the Internet, using an appropriate protocol, such as http or SSL (step 3002). The user interaction may be initialized with the central server using a username/password or other type of authentication. For example, the user initialization (step 3002) may provide information such as likes/dislikes of genres or brands, favorites, previous orders, etc. This information may or may not be used in a subsequently selection screen which allows the user to eventually purchase a video.

Once the user is authenticated, the central server provides an user interface 3004 which enables the user to take a number of actions for obtaining an animated video. In the present embodiments, the user may select a desired animation video directly (step 3006), or the user may select a prepackaged advertisement (step 3008), or the user may select a desired price point (step 3010). In some embodiments, the user interface may be presented as a webpage such as in the ASP, JAVA, or .Net format.

If the user chooses to proceed with selecting a video (step 3006), the user is then be presented with a preview of the animation as well as various ads and products available to be customized in the video (step 3012). The ads and products may be presented to the user in order to provide a price discount to the user. An example of this interface can be found in FIG. 20. After the user completes the customization of the acceptable advertisements or product placements (step 3014), the user has the option to add the product to the cart (step 3024) and check out securely in a standard online, mobile, or other type of checkout process (step 3026).

Alternately, the user may choose to proceed with purchasing a video by selecting a set of prepackaged advertisements and/or product placements (step 3008). An example of this is a Nike and Gatorade sponsored video or a Macys and Paramount sponsored video. Typically the brands have something to do with the content in the video, but this is not always the case. In one example, the videos sponsored by the brands are shown to the user without the user first selecting a brand or set of brands. After the user selects either the brand or brands and sees which videos are available, the pricing of each video is shown based on the current selections (step 3016). The pricing may also be shown on the initial screen as well. The user then selects a video (step 3018) and may either additionally customize the ads or product placement of the branded elements (step 3014). Finally, the user may proceed to add the product to the cart (step 3024) and proceed to the check out process (step 3026).

Finally, the user may choose to purchase a video is by choosing a price point which is acceptable to the user (step 3010). After the user chooses a price point, a combination of videos and advertisements/product placements within each video are shown to the user (step 3020). The user may then select a video based upon the current price point he has chosen (step 3022). The user may then either additionally customize the ads or product placement of the branded elements (step 3014). Finally, the user may proceed to add the product to the cart (step 3024) and proceed to the check out process (step 3026).

Figure 20:
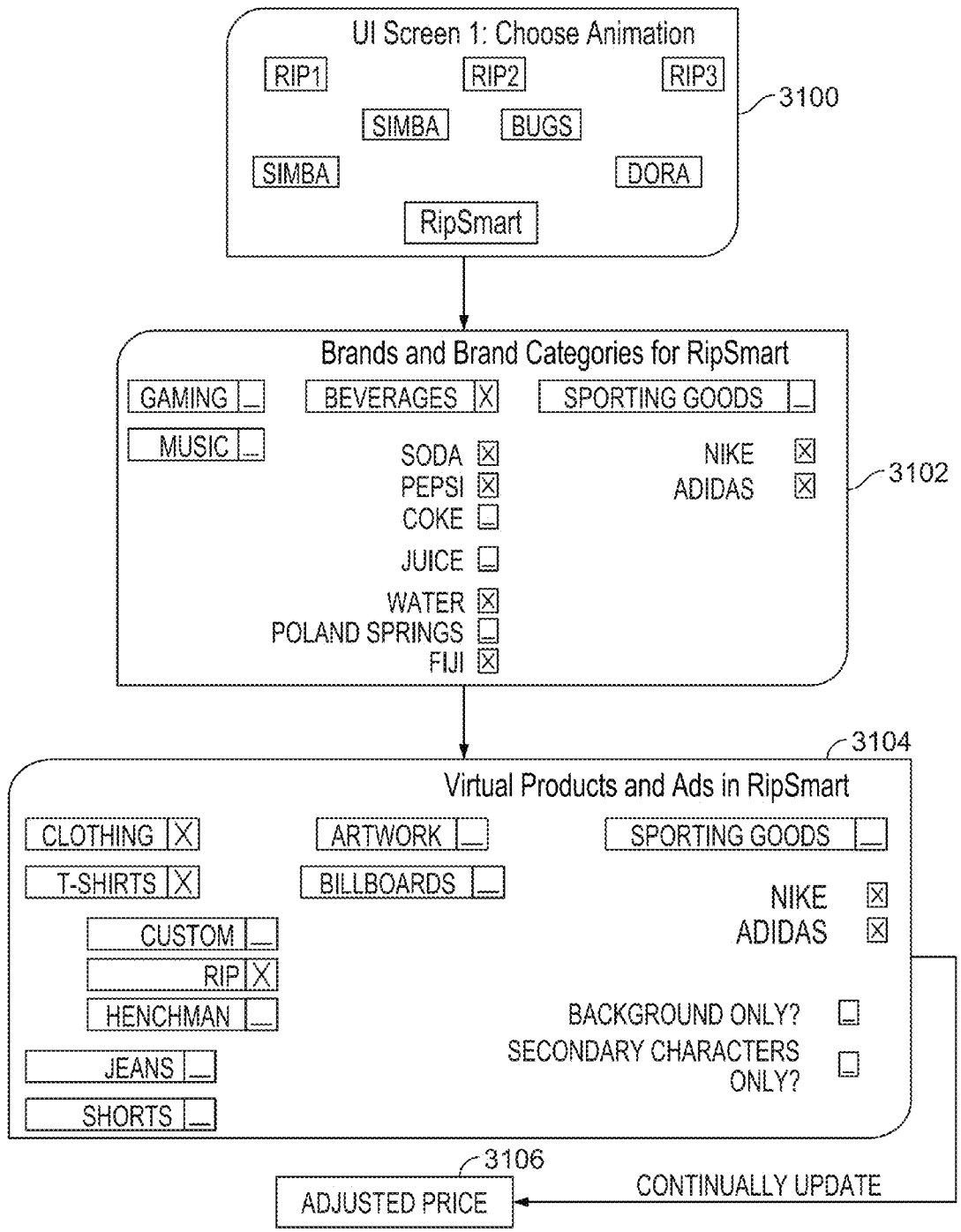
FIG. 20 illustrates several user interfaces which can be used to facilitate the method described in FIG. 19.

FIG. 20 illustrates several user interfaces which can be used to facilitate the method described in FIG. 19. The user interfaces can be viewed on any display device, such as a TV, a computer, a mobile device, a game console, for example.

A first user interface 3100 allows the user to select the media content that he wants to view. In the present illustration, the screen shows a number of options that can be selected. Other options that are not visible can be accessed by scrolling. Sub-categories can also be viewed for a specific piece of content. For example, the Rip Smart animation may have multiple episodes and others that are not visible but can be accessed by scrolling. The user can therefore pick a specific property such as the Rip Smart animation and a specific sub-set of that media property such as a specific Rip Smart episode, for example. Once the specific media property has been chosen, the user can select that animation for viewing through a button or other selection interface.

A second user interface 3102 allows the user to opt-in for advertising and select specific brands and/or brand categories for which they are willing to opt-in. In the present illustration, the user is shown preference options, which may be initially populated based on the historic preferences of the user. Categories for opt-in advertising can be shown, as well as sub-categories. For example, in FIG. 20, the user has opted-in for the category of beverages, but only for soda and water, as indicated by the checked boxes. The user can more specifically opt-in for specific brands or sub-categories. In the present illustration, under the category of soda, the user can allow advertising, including product placement, from brands such as Pepsi and Coke. Similarly, the user can allow advertising, including product placement, from sub-categories independent of brand. For example, under the category of water, the user can allow advertising, including product placement, from the brand of Fiji or from sub-categories of sparking water, flavored water, or plain water (not shown). As another example in FIG. 11, the user can select to opt-in for sporting goods. Subsequently, the user can select to opt-in or opt-out for specific shoe brands such as Nike or Adidas. The user can choose to apply these preferences to other forms of media, such as gaming or music. Also, the user may choose to donate their benefits, such as pricing discounts for example, to a charity which can also be selected through this interface. In some embodiments, the interface may change dynamically as a function of choices made by the user.

The specific opt-in selections made by the user can impact the benefits to the user. For example, if the benefit to the user is a discounted purchase price through sponsorship by the advertiser, then the purchase price to the user may be decreased more if they opt-in to advertising from an advertiser who is willing to sponsor at a higher level. In other words, one brand advertiser may be willing to provide a larger discount to users than another brand advertiser in order to incent users to opt-in for product placement of their brand over their competitor's brand.

A third user interface 3104 can be used to enable the user to select how the advertising or product placement is delivered. For example, the product placement may be delivered through the clothing that the characters are wearing, and more specifically through sub-categories of this such as on t-shirts, jeans, shoes, or shorts. Even more specifically, the user may be permitted to choose which character's clothing shows the advertising. In the example of the Rip Smart animation, the user may choose to have the advertising displayed by the main character Rip Smart, by another character through a custom setup, or by generic henchmen. Similar to the choices made on the second user interface 3102 discussed above, the selections made on the user interface 3104 can impact the benefits to the user. For example, an advertiser may be willing to sponsor product placement at a higher level if the product placement is associated with the main character versus one of the henchmen. Conversely, users may prefer not to have the product placement associated with a main character. For example, a parent may allow product placement in a child's show but not associated with the main character if they feel that the child looks up to the main character and is likely to be more strongly influenced by that character.

Other examples of options for the delivery of the advertising include allowing it in the artwork, on billboards in the video, through equipment, including sub-categories of equipment such as a surfboard or a ball, and any number of other options. Although the user can be enabled through these interfaces to specifically define the way in which they opt-in to advertising, it is not necessary for the user to address each category and sub-category specifically. These may be automatically set to default settings which the user can accept or modify at his discretion. Broader choices can also be enabled such as, for example, the ability to enable advertising in the background only or on secondary characters only. A specific user's preferences can be stored and used to automatically populate the options for subsequent products.

All of the user interfaces discussed above can provide feedback to the user about the change in the benefit to the user based on the choices they are making as they opt-in or opt-out of various advertising options. If the benefit is a pricing discount for example, then the adjusted price 3106, which depends on the selections made by the user, can be shown and continually updated as the user changes selections. Similarly, other benefits, such as coupons, promotional gifts, and discount codes, for example, can be shown and continually updated as the user changes selections. Similarly, the options can be updated as the user changes selections. For example, certain options for delivery of advertising may only be available for certain brands and will not be shown as options if the user does not opt-in to those brands. All of the changes or benefits that occur as a function of user choices can be shown next to the choices themselves and updated continuously if they are affected by other choices. For example, marketers of different brands are offering to sponsor a discount of a product being ordered by the user, the amount of discount offered by each brand can be shown next to brand choices on the user interface 3102.

Figure 21:
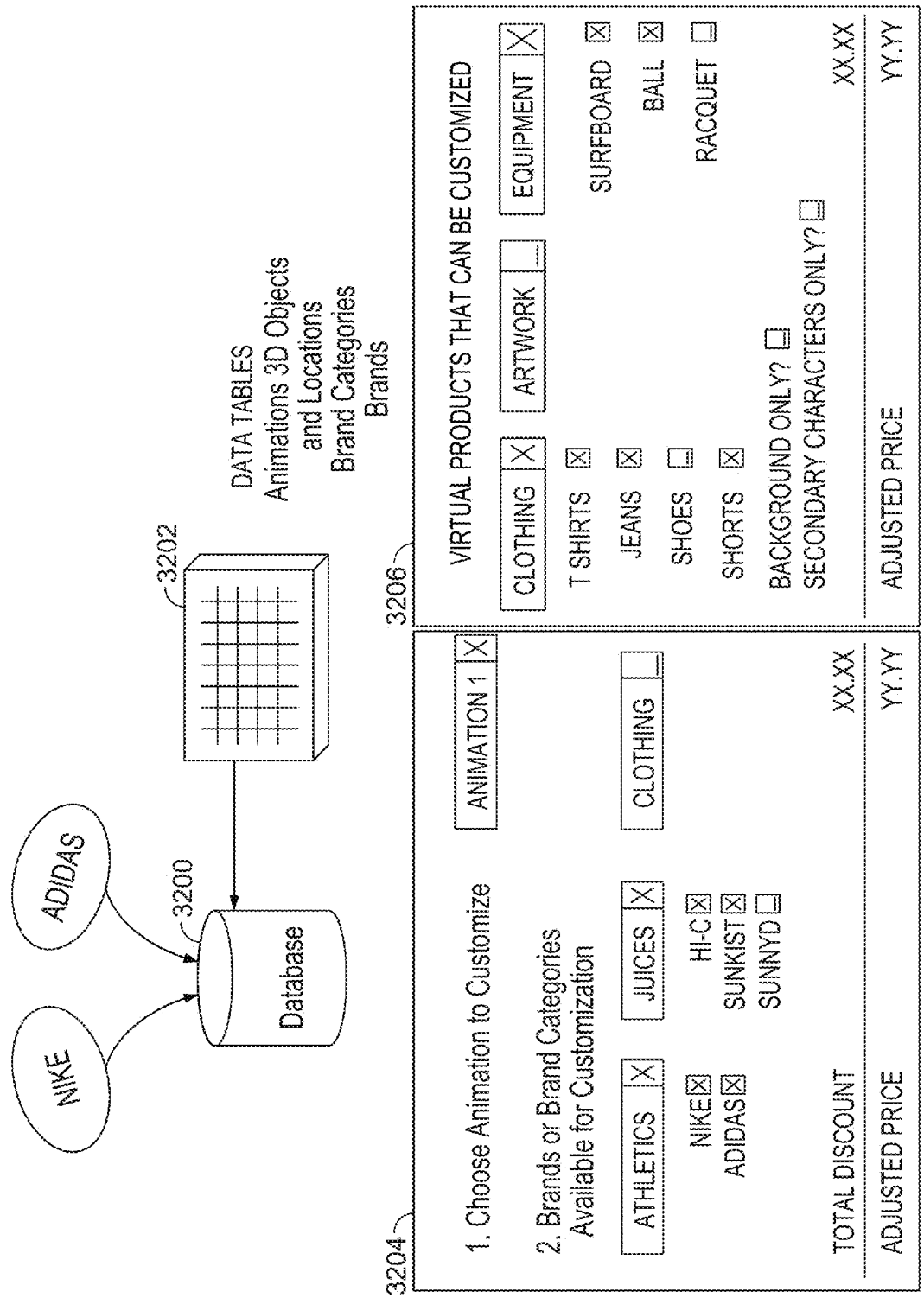
FIG. 21 illustrates a system process and user interface that may be used by a user to customize a video or other products with an advertiser's digital objects according to another embodiment of the present invention.

FIG. 21 illustrates a system process and user interface that may be used by a user to customize a video with an advertiser's digital objects according to another embodiment of the present invention. Referring to FIG. 21, a database 3200 is maintained at a remote storage site and contains typical data tables 3202 that store information such as, but not limited to, brand names, brand categories, textures and other two-dimensional or three-dimensional objects, and pricing, for example. The database 3200 may be in communication with a central server that provides customized videos.

A user interface 3204 is provided to enable a user to opt-in for allowing a brand imprint to be portrayed in a specific video the user is watching. For example, the user may choose an animated video to customize ("Animation1"). That is, the user selects the video to allow advertising or product placement to be placed in the video. The user may further define which particular brand categories (all, some, or none), which brands (all, some, or none per category), which product categories (all, some, or none), or which products (all, some, or none per category) to be included in the video he is choosing to customize. In the present illustration, a user is choosing not to allow any clothing brands, but is willing to allow the Juice category with Hi-C and Sunkist brands but not the Sunny D brand. The user is also allowing the athletic category and both the Nike brand and the Adidas brand to be placed into the video he will be watching.

After the user selects each allowable brand or brand category to portray brand information in the video, the system calculates the discount percentage that can be potentially applied to the video the user is purchasing based upon a formula to generate the final price of the video (the adjusted price). In one embodiment, the formula is defined as a price calculated based on the user's choices and the amount the advertisers are willing to pay for their advertisement placement.

In a second user interface 3206, the user can further customize the brands that appear in the video he will be viewing by choosing from a list of objects that appear in the video. That is, the user interface 3206 provides a list of the virtual products that can be customized by the user. The information for what is available relates to what is stored in the database 3200. For instance, database 3200 may store information relating to which products in the video can be customized by which brand or brand category. In the present illustration, from the currently selected video Animation1 and the currently selected allowable brands Nike, Adidas, there are clothing items, including T-Shirts, Jeans, Shoes, and Shorts, that all exist in the video and which can be customized with brand information correlating to what the user has selected. Furthermore, the user interface 3206 also allows customization of the artwork and equipment used in the video, such as surfboard and ball.

In user interface 3206, the user may elect to allow a brand to only be displayed in the background and on a painting, billboard, or other type of static object. This indicates a passive element in the video as opposed to an active event such as, but not limited to, kicking a branded ball, drinking from a branded container, etc.

In user interface 3206, a user may elect to allow only non-primary or non-principal characters in a show to incorporate brand or product placement. Principal characters can be defined as having significant roles in the video or characters that are part of a recurring cast.

Examples of what the user may see in the final video from the previous examples given are a video with the main character in the video wearing a Nike T-Shirt. Other examples include a Sunkist drink on a surfboard or a Hi-C pair of Shorts. After the user selects each allowable brand or brand category to portray brand information in the video he is watching, the system calculates the discount percentage that is potentially applied to the product they are purchasing based upon a formula to produce a final price of the video. In one embodiment, the formula is defined as a price calculated based on the user's choices and the amount the advertisers are willing to pay for their advertisement placement.

The user may also be presented with other options or incentives to further receive benefit from the purchase of the video. In some embodiments, the user may be offered promotional brand items such as, but not limited to participating brand offerings (physical goods, gift cards, coupons, etc). The user may also elect to donate some or all of the discount to a charity of his choice.

Figure 22:
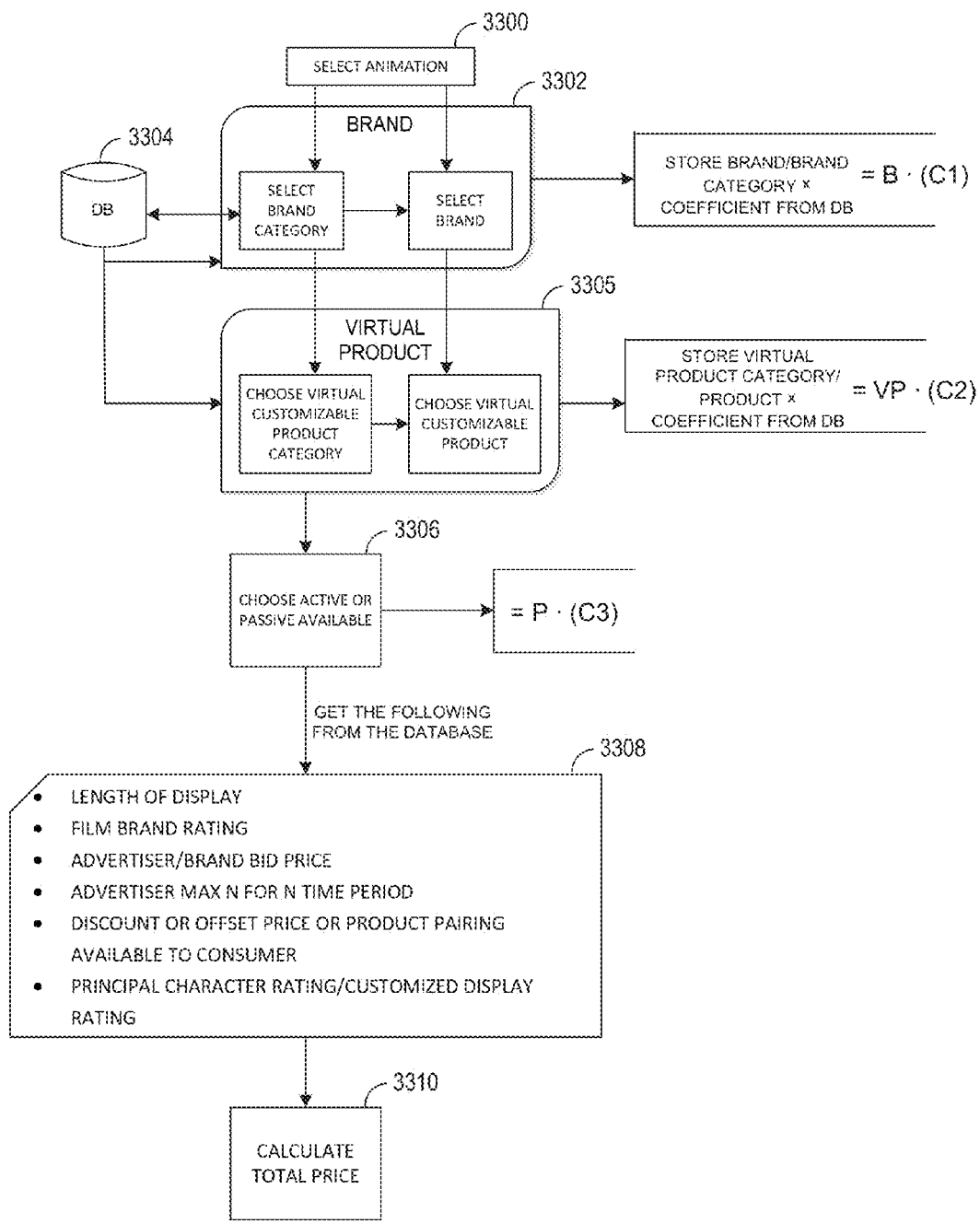
FIG. 22 illustrates a method for calculating a product pricing for a user for a customized video including opt-in advertising according to one embodiment of the present invention.

FIG. 22 illustrates a method for calculating a product pricing for a user for a customized video including opt-in advertising according to one embodiment of the present invention. In some cases, an advertiser may offer to pay certain amount in order to reduce the user's pricing when users opt-in to include its advertising. Referring to FIG. 22, In step 3300, identification of a user-selected animation video product is provided to the pricing calculation. For example, when the Rip Smart animation is selected, the following variable assignment can be used:

productname=Rip Smart, where productname is the variable defining the name of the video product.

A database 3304 is used to store information about each video product which may include, for example, the number of brand categories that are able to be incorporated into the specific video product, an array of brand category names, the number of sub-categories associated with each brand category, an array of sub-category names, the number of brands associated with each brand sub-category, an array of brand names, the number of advertising delivery options for each brand type, the names of each advertising delivery option, the number of sub-options within each delivery option, the names of each sub-option, and a data array that can be used to track which advertising options have been selected and the pricing discount associated with each option. For example, a data array called placement(a,b,c,d,e) can be used with each entry having a possible value of zero to indicate no placement of that type or a value of one to indicate placement of that type, and where "a" denotes the brand category, "b" denotes the sub-category, "c" denotes the brand name, "d" denotes the method of advertisement delivery, and "e" denotes the sub-set of the method of advertisement delivery, such as a specific character that might wear a branded clothing item for example. A similar data array called discount(a,b,c,d,e) can be used to store the pricing discounts associated with each option, in which the parameters a,b,c,d, and e are defined in the same way as for placement(a,b,c,d,e). Here delivery means the specific mode of displaying the advertisement to a user. Some examples of advertisement delivery include product placement through branded clothing or objects in a video and posters or banner advertisements in a video.

Specifically, the Rip Smart datafile in the database 3304 might include the following information, for example:

numberofcategories=3
categoryname(1)=beverages
categoryname(2)=sporting goods
categoryname(3)=shoes
categorysubs(1)=3
categorysubs(2)=1
categorysubs(3)=1
categorysubname(1,1)=juice
categorysubname(1,2)=soda
categorysubname(1,3)=water
brandnumber(1,1)=3
brandnumber(1,2)=1
brandnumber(1,3)=1
brandname(1,1,1)=Hi-C
brandname(1,1,2)=Sunkist
brandname(1,1,2)=SunnyD
brandname(1,2,1)=Cherry-O
brandname(1,3,1)=Sparklefree
numberofdeliveryoptions=3
deliveryname(1)=clothing
deliveryname(2)=artwork
deliveryname(3)=billboard
deliverysubs(1)=3
deliverysubs(2)=1
deliverysubs(3)=1
deliverysubname(1,1)=T-shirts
deliverysubname(1,2)=shoes
deliverysubname(1,3)=shorts
placement(1,1,1,1,1)=1
discount(1,1,1,1,1)=$0.50
placement(1,1,2,1,1)=1
discount (1,1,2,1,1)=$0.75
etc. . . .

where numberofcategories is the number of brand categories that are able to be incorporated into the specific product, categoryname(i) is the name of the $i^{th}$ brand category, categorysubs(i) is the number of sub-categories associated with the $i^{th}$ brand category, categorysubname(i,j) is the name of the $j^{th}$ sub-category associated with the $i^{th}$ brand category, brandnumber(i,j) is the number of brands associated with the $j^{th}$ sub-category of the $i^{th}$ category, brandname(i,j,k) is the $k^{th}$ brand name of the $j^{th}$ sub-category of the $i^{th}$ brand category, numberofdeliveryoptions is the number of advertising delivery options for each brand type, deliveryname(i) is the name of the $i^{th}$ advertising delivery option, deliverysubs(i) is the number of sub-options for the $i^{th}$ advertising delivery option, deliverysubname(i,j) is the name of the $j^{th}$ sub-option of the $i^{th}$ advertising delivery option, placement(i,j,k,l,m) is the status, typically either activated or not activated, of product placement for the of the $m^{th}$ sub-option of the $l^{th}$ advertising delivery option for the $k^{th}$ brand name of the $j^{th}$ sub-category of the $i^{th}$ brand category, and discount(i,j,k,l,m) is the pricing discount associated with the product placement for the of the $m^{th}$ sub-option of the $l^{th}$ advertising delivery option for the $k^{th}$ brand name of the $j^{th}$ sub-category of the $i^{th}$ brand category. Alternative database structures can be developed to achieve the same result of storing all of the data necessary to enable a product pricing calculation. The above database structures are illustrative only and are not intended to be limiting.

Once the product identification is input, the method identifies the advertised brands and delivery of the advertised brands. In one embodiment, the method checks the database 3304 for brand categories, sub-categories, and/or specific brands that can be advertised in the product (step 3302). This information can be presented to the user and the user can chose to opt-in to one or more of the brands for advertising, including product placement. This may include the selection of specific brands or broader brand categories or sub-categories. A database may also store pre-defined preferences for a specific user and automatically select the available brand categories, sub-categories, and/or specific brands that match those preferences. After the specific brands have been selected for which the user has opted-in for advertising, a brand pricing coefficient can be calculated which reflects the impact of the brand choices on the possible pricing discounts available given other inputs such as delivery options for example. This may be the pricing discount of the most attractive options for the brands chosen, recognizing that the advertising of some brands within the same product may be mutually exclusive. For example, in the product placement of shoes, a character may wear the Nike brand or Adidas brand but not both. This brand pricing coefficient may be shown to the user as a maximum discount number, for example, depending on previous and/or subsequent opt-in choices. Similarly, a range of possible pricing discounts can be calculated and presented to the user as the user inputs the data for opt-in brand categories, sub-categories, and/or specific brands based on calculating the pricing discount associated with the current opt-in selections and each possible combination of subsequent opt-in selections for delivery options and any other opt-in selections excluding brand categories, sub-categories, and/or specific brands.

For each brand for which the user has opted-in for advertising, the system can then address delivery options by checking the database 3304 for the delivery options that are available in the product selected as well as the names of those delivery options (step 3305). This information can be presented to the user and the user can chose to opt-in to one or more of the delivery options for advertising, including product placement. In the present description, delivery refers to incorporating the selected advertisement in the selected animation. This may include the selection of specific delivery option categories or sub-categories. The database 3304 may also store pre-defined preferences for a specific user and automatically select the available delivery option categories or sub-categories that match those preferences. After the specific delivery options have been selected for which the user has opted-in for advertising, a delivery pricing coefficient can be calculated which reflects the impact of the delivery choices on the possible pricing discounts available given other inputs such as delivery options for example. The delivery pricing coefficient can be calculated, for example, as a specific number which reflects the pricing discount of the most attractive options for the delivery options chosen, recognizing that the advertising of some delivery options within the same product may be mutually exclusive. This delivery pricing coefficient may be shown to the user as a maximum discount number, for example, depending on previous and/or subsequent opt-in choices. Similarly, a range of possible pricing discounts can be calculated and presented to the user as the user inputs the data for opt-in delivery option categories or sub-categories based on calculating the pricing discount associated with the current opt-in selections and each possible combination of subsequent opt-in selections excluding delivery option categories or sub-categories.

In subsequent steps, the system can address other opt-in factors that may impact the benefit to the user. In the present embodiment, the user is willing to allow active engagement with the branded advertisement in the product or only have it visible but with no engagement (step 3306), the later choice being a more passive advertisement with potentially a different discount value. This optional step 3306 may enable another pricing coefficient which could be shown to the user and/or subsequently used to calculate a pricing discount for example.

Additional data may be required to calculate the final price depending on the specific formula and methodology used. This data can be stored in a database and retrieved as needed (step 3308). The data might include information such as the length of the advertising display, a rating tied to the value of the film brand, the discount associated with a specific brand and display option, the time period over which the advertisement shall be shown, other benefits tied to the opt-in for the advertising, and other information relevant to the final pricing calculation.

The final pricing calculation 3310 can be performed in a number of ways, depending on the specific property and objectives. In one embodiment, the pre-defined discounts can be added up for each of the placement options that were selected by the user after resolving mutually exclusive selections by choosing the one that provides the highest discount. In other words, one can add up all the values for discount(i, j,k,l,m) in which placement(i,j,k,l,m)=1, but after setting placement(i,j,k,l,m)=0 for all conflicting advertising options. For example, the system might allow only one product placement for T-shirts. In the example dataset shown above for Rip Smart, both placement(1,1,1,1,1)=1 and placement(1,2,1,1,1)=1 meaning that the user opted-in for both the Hi-C and Sunkist brands delivered on T-shirts. In this example dataset, the discount associated with Hi-C is equal to discount(1,1,1,1,1)=$0.50 and the discount associated with Sunkist is equal to discount(1,1,2,1,1)=$0.75 such that the system would automatically select the higher discount of $0.75 and place the Sunkist brand on the T-shirts and set placement(1,1,1,1,1)=0 to remove the conflicting Hi-C advertisement option. Additional factors can be incorporated into the pricing calculation. For example, in the case of a video product, the distribution vehicle may be included as a factor in the pricing calculation in which the distribution vehicle may be a mobile device, computer, television, or other device that may have a different pricing discount value associated with it based on the perceived relative value of the advertising by the brand owner. The data for the array discount(i,j,k,l,m) can also be modified dynamically, through a bidding system for example. A variety of bidding systems can be used to modify the values in the array discount(i,j,k,l,m) such as allowing brand owners to directly change the values associated with their brands. Similarly, brand owners can enter a maximum value associated with each entry associated with their brands and the system can automatically adjust the values in the array discount(i,j,k,l,m) to the lowest value that still allows a brand owner to exceed the values of conflicting options if this is possible without exceeding the maximum value set by the brand owner.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

We claim:

1. A system for generating cartoonized representations of a subject and incorporating the cartoonized representations into an animated video, the system comprising:
    a cartoonizing application configured to receive a photograph or other two-dimensional depiction of the subject as data input, the cartoonizing application further configured to identify at least one feature of the subject from the photograph or other two-dimensional depiction, to quantify one or more parameters associated with the identified feature, and to select one or more objects from a database of cartoonized objects by matching the parameters of the identified features to corresponding parameters of the objects in the database, the cartoonizing application applying algorithms to quantify the one or more parameters and to select the one or more objects from the database automatically without user intervention, the cartoonizing application thereby generating one or more customizable objects representative of the subject;
    a content management application configured to receive the one or more customizable objects from the cartoonizing application and to receive data input defining one or more pre-selected animation settings, the content management application configured to generate data files being an assembly of one or more objects, the assembly of one or more objects including the one or more customizable objects generated by the cartoonizing application or one or more customizable objects selected from the database of cartoonized objects based on the pre-selected animation settings; and
    an animation application configured to receive the data files from the content management application and operative to render an animated video using the data files and a selected animated story, wherein the animated video thus rendered includes the assembly of one or more objects integrated seamlessly into the animated story to create a customized animated story incorporating the cartoonized representations of the subject and the pre-selected animated settings,
    wherein the animation application is further operative to provide a base storyline as the selected animated story, the base storyline comprising one or more base animation segments, to receive a selection of a plurality of user-customized animation segments, a first one of the selected user-customized animation segments incorporating a first plurality of customizable objects and a second one of the selected user-customized animation segments incorporating a second plurality of customizable objects, the customizable objects including customizable objects representative of the subject and customizable objects selected from the database of cartoonized objects based on the pre-selected animation settings, wherein the second plurality of customizable objects is not identical to the first plurality of customizable objects, to replace one or more of the base animation segments with user-customized animation segments selected from the plurality of the user-customized animation segment, and to render a customized animated video of the base storyline incorporating the replaced user-customized animation segments.

2. The system of claim 1, wherein the content management application is configured to modify the one or more customizable objects generated by the cartoonizing application based on the pre-selected animation settings.

3. The system of claim 1, wherein the content management application is configured to generate one or more customizable objects being a realistic cartoonized representation of the subject or photorealistic cartoonized representation of the subject or a stylized representation of the subject.

4. The system of claim 1, wherein the content management application is configured to generate one or more customizable objects being in the same graphic style as the selected animation story.

5. A method for generating cartoonized representations of a subject and incorporating the cartoonized representations into an animated video, comprising:
    receiving a photograph or other two-dimensional depiction of the subject as data input;
    identifying at least one feature of the subject from the photograph or other two-dimensional depiction;
    quantifying, using an algorithm and without user intervention, one or more parameters associated with the identified feature;
    selecting, using an algorithm and without user intervention, one or more objects from a database of cartoonized objects by matching the parameters of the identified features to corresponding parameters of the objects in the database;
    generating one or more customizable objects representative of the subject;
    receiving data input defining one or more pre-selected animation settings;
    generating data files being an assembly of one or more customizable objects, the assembly of one or more customizable objects including the one or more customizable objects representative of the subject or one or more customizable objects selected from the database of cartoonized objects based on the pre-selected animation settings;
    rendering an animated video using the data files and a selected animated story,
    wherein the animated video thus rendered includes the assembly of one or more customizable objects integrated seamlessly into the animated story to create a customized animated story incorporating the cartoonized representations of the subject and the pre-selected animated settings; and
    wherein rendering an animated video using the data files and a selected animated story comprises:
        providing a base storyline as the selected animated story, the base storyline comprising one or more base animation segments;
        receiving a selection of a plurality of user-customized animation segments, a first one of the selected user-customized animation segments incorporating a first plurality of customizable objects and a second one of the selected user-customized animation segments incorporating a second plurality of customizable objects, the customizable objects including customizable objects representative of the subject and customizable objects selected from the database of cartoonized objects based on the pre-selected animation settings, wherein the second plurality of customizable objects is not identical to the first plurality of customizable objects;
        replacing one or more of the base animation segments with user-customized animation segments selected from the plurality of the user-customized animation segments; and
        rendering a customized animated video of the base storyline incorporating the replaced user-customized animation segments.

6. The method of claim 5, further comprising:
providing multiple animation segments, at least one of the selected animation segments incorporating the one or more customizable objects representative of the subject or one or more customizable objects selected from the database of cartoonized objects based on the pre-selected animation settings;
receiving a selection of one or more animation segments from the multiple animation segments;
receiving an arrangement of the selected animation segments to form a storyline; and
rendering a customized animated video of the arranged animation segments.

* * * * *

UNITED STATES PATENT AND TRADEMARK OFFICE
CERTIFICATE OF CORRECTION

| | | |
|---|---|---|
| PATENT NO. | : 8,963,926 B2 | Page 1 of 1 |
| APPLICATION NO. | : 12/948750 | |
| DATED | : February 24, 2015 | |
| INVENTOR(S) | : Brown et al. | |

It is certified that error appears in the above-identified patent and that said Letters Patent is hereby corrected as shown below:

On the title page item 56 (other publications), delete "Hong Chen et al., "PicToon: A Personalized Image-based Cartoon System," In Proceedings of the Tenth ACM International Conference on Multimedia (Juan-les-Pins, France, Dec. 1-6, 2002). Multimedia' 02, ACM, New Yourk, NY, 171-178."
and insert
--Hong Chen et al., "PicToon: A Personalized Image-based Cartoon System," In Proceedings of the Tenth ACM International Conference on Multimedia (Juan-les-Pins, France, Dec. 1-6, 2002). Multimedia' 02, ACM, New York, NY, 171-178."-- therefor.

Signed and Sealed this
Fourteenth Day of June, 2016

Michelle K. Lee
*Director of the United States Patent and Trademark Office*